United States Patent
Martin et al.

(10) Patent No.: US 11,052,285 B2
(45) Date of Patent: Jul. 6, 2021

(54) SYSTEM AND METHOD FOR USING WEATHER APPLIED METRICS FOR PREDICTING THE FLIGHT OF A BALL

(71) Applicant: Martin Meter LLC, Orinda, CA (US)

(72) Inventors: William Martin, Orinda, CA (US); John Paul Farley, Lexington, SC (US); John Amirault Farley, Lexington, SC (US); Peter Jackson, Orinda, CA (US); Douglas Milton Sinton, Palo Alto, CA (US); Metin Ozen, Sunnyvale, CA (US)

(73) Assignee: Martin Meter LLC, Orinda, CA (US)

( * ) Notice: Subject to any disclaimer, the term of this patent is extended or adjusted under 35 U.S.C. 154(b) by 451 days.

(21) Appl. No.: 15/951,057

(22) Filed: Apr. 11, 2018

(65) Prior Publication Data
US 2018/0229080 A1 Aug. 16, 2018

Related U.S. Application Data

(63) Continuation-in-part of application No. 15/796,983, filed on Oct. 30, 2017, now abandoned.
(Continued)

(51) Int. Cl.
*A63B 24/00* (2006.01)
*G01S 15/88* (2006.01)
(Continued)

(52) U.S. Cl.
CPC .......... *A63B 24/0021* (2013.01); *G01S 7/003* (2013.01); *G01S 13/865* (2013.01);
(Continued)

(58) Field of Classification Search
CPC ...... G01S 13/865; G01S 15/885; G01S 17/95; G01S 7/003; A63B 24/0021
See application file for complete search history.

(56) References Cited

U.S. PATENT DOCUMENTS

2005/0233815 A1* 10/2005 McCreary .......... A63B 24/0021
  473/131
2007/0167247 A1 7/2007 Lindsay
(Continued)

OTHER PUBLICATIONS

Sawicki et al., "How to Hit Home Runs: Optimum Baseball Bat Swing Parameters for Maximum Range Trajectories", American Association of Physics Teachers, http://baseball.physics.illinois.edu/AJP-Nov03.pdf, Jun. 12, 2002, 11 pages.
(Continued)

*Primary Examiner* — Catherine T. Rastovski
*Assistant Examiner* — Liam R Casey
(74) *Attorney, Agent, or Firm* — Beyer Law Group LLP

(57) ABSTRACT

A system and method for using weather applied metrics for determining the impact of weather conditions on the flight of a ball at an outside sports venue. Historical and current data for weather parameters, including wind, air pressure, humidity, temperature, and rain, are obtained to calculate the influence of each parameter on the flight of a ball. The influences of each of the parameters are summed to model the flight of the ball based on the current weather conditions. Weather instruments, such as weather sensors, anemometers, LiDAR and SODAR devices, weather consoles, data routing devices, and processors can be included in a system for using weather applied metrics to predict the flight of a ball based on current weather conditions.

15 Claims, 14 Drawing Sheets

Related U.S. Application Data

(60) Provisional application No. 62/414,686, filed on Oct. 29, 2016.

(51) Int. Cl.

| | | |
|---|---|---|
| *G01S 17/95* | (2006.01) | |
| *G06F 17/18* | (2006.01) | |
| *G01S 13/86* | (2006.01) | |
| *G01S 7/00* | (2006.01) | |
| *G01S 13/88* | (2006.01) | |
| *G09B 19/00* | (2006.01) | |
| *G09B 9/00* | (2006.01) | |
| *G01S 17/86* | (2020.01) | |
| *G01S 17/42* | (2006.01) | |

(52) U.S. Cl.
CPC .......... *G01S 13/88* (2013.01); *G01S 15/885* (2013.01); *G01S 17/86* (2020.01); *G01S 17/95* (2013.01); *G09B 9/00* (2013.01); *G09B 19/00* (2013.01); *G09B 19/0038* (2013.01); *G01S 17/42* (2013.01); *G06F 17/18* (2013.01); *Y02A 90/10* (2018.01)

(56) References Cited

U.S. PATENT DOCUMENTS

| | | |
|---|---|---|
| 2013/0314694 A1 | 11/2013 | Tchoryk, Jr. et al. |
| 2014/0327569 A1* | 11/2014 | Fun .................... F03D 80/10 342/26 D |
| 2018/0117400 A1 | 5/2018 | Martin et al. |

OTHER PUBLICATIONS

Kensrud, "Determining Aerodynamic Properties of Sports Balls in Situ", Washington State University, Department of Mechanical and Materials Engineering, http://baseball.physics.illinois.edu/KensrudThesis.pdf, Aug. 2010, 127 pages.

National Aeronautics and Space Administration, "Lift of a Baseball", https://www.grc.nasa.gov/www/k-12/airplane/balllift.html, May 2007, 2 pages.

Nathan, "The Effect of Spin on the Flight of a Baseball", Department of Physics, University of Illinois, Urbana, Illinois 61801, http://baseball.physics.illinois.edu/AJPFeb08.pdf, Jun. 27, 2007, 6 pages.

Clanet, "Sports Ballistics", Annual Review of Fluid Mechanics, http://baseball.physics.illinois.edu/clanet/ClanetSportsBallistics.pdf, Sep. 22, 2014, 26 pages.

Nathan, "Going Deep on Goin' Deep", The Hardball Times, https://tht.fangraphs.com/going-deep-on-goin-deep/, Apr. 6, 2016, 10 pages.

Russell, "Forces Between Bat and Ball", Graduate Program in Acoustics, Pennsylvania State University, https://www.acs.psu.edu/drussell/bats/impulse.htm, 2001-2011, 2 pages.

Werner, "Flight Model of a Golf Ball", http://www.users.csbsju.edu/~jcrumley/222_2007/projects/awwerner/project.pdf, Mar. 2007, 13 pages.

"Relationship Between Density, Pressure, and Temperature", http://msrc.sunysb.edu/~chang/atm205/Notes/Chapter_1_txtb.pdf, downloaded from the internet on Jan. 24, 2019, 7 pages.

Hample, "1,000-foot Baseball Catch", https://mlblogssnaggingbaseballs.wordpress.com/2012/06/15/1000-foot-baseball-catch/, Jun. 15, 2012, 7 pages.

Kothmann, "Aerodynamics of Sports Balls", Annual Review of Fluid Mechanics, https://www.seas.upenn.edu/~meam211/slides/aero.pdf, Jan. 2007, 13 pages.

Alam et al., "A Study of Baseball and Softball Aerodynamics", SciVerse ScienceDirect, Procedia Engineering 34 (20120 86-91, https://ac.els-cdn.com/S1877705812016293/1-s2.0-S1877705812016293-main.pdf?_tid=f0325ef2-6a06-4cd7-b872-a3eb612c683a&acdnat=1548790839_859bf532733e01ae3cf4901e7754e515, Mar. 2, 2012, pp. 86-91.

Adair, "The Physics of Baseball", Physics Today, https://www.freewebs.com/anskyboy2/Physics%20of%20Baseball%20(Adair).pdf, May 26, 1995, 6 pages.

Fitzpatrick, "Air Drag", http://farside.ph.utexas.edu/teaching/329/lectures/node42.html, Mar. 29, 2006, 5 pages.

Kagan et al., "Simplified Models for the Drag Coefficient of a Pitched Baseball", The Physics Teacher, vol. 52, http://baseball.physics.illinois.edu/DragTPTMay2014.pdf, May 2014, 3 pages.

"Life's a Drag Crisis", https://thatsmaths.com/2015/11/26/lifes-a-drag-crisis/, Nov. 26, 2015, 3 pages.

Frohlich, "Aerodynamic Drag Crisis and its Possible Effect on the Flight of Baseballs", American Association of Physics Teachers, Am. J. Phys., vol. 52, No. 4, Institute for Geophysics, University of Texas at Austin, http://ww2.odu.edu/~agodunov/teaching/phys420/files/Frohlich.pdf, Apr. 1984, 10 pages.

Mehta, "Aerodynamics of Sports Balls", Ann. Rev. Fluid Mech., https://people.stfx.ca/smackenz/courses/HK474/Labs/Jump%20Float%20Lab/Mehta%201985%20Aerodynamics%20of%20sports%20balls.pdf, 1985, 17:151-89, 40 pages.

Brancazio, "The Physics of Kicking a Football", The Physics Teacher, http://citeseerx.ist.psu.edu/viewdoc/download?doi=10.1.1.694.2525&rep=rep1&type=pdf, Oct. 1995, 5 pages.

Horn et al., "On the Flight of the American Football", Physics Department, California State University Fullerton, https://physics.fullerton.edu/~heidi/PROJECTS/football.pdf, Jun. 4, 2007, 22 pages.

Penner, "The Physics of Golf", Institute of Physics Publishing, Reports on Progress in Physics 66 (2003) pp. 131-171, http://raypenner.com/golf-physics.pdf, Dec. 20, 2002.

Trackman, "Normalization Feature Explained", Jul. 9, 2014, https://web.archive.org/web/20140808093226/https://blog.trackmangolf/normalization-feature-explained, 9 pages.

Kemp, "Weather: A Major Factor", Aug. 2007, https://web.archive.org/web/20150831004156/https://www.golfdigest.com/story/gw070803pgaweather, 6 pages.

Alaways, "Aerodynamics of the Curve-Ball: An Investigation of the Effects of Angular Velocity on Baseball Trajectories", Jan. 1998 Dissertation, https://www.researchgate.net/publication/241376252_Aerodynamics_of_the_curveball_An_investigation_of_the_effects_of_angular_velocity_on_baseball_trajectories, 151 pages.

Jalilian et al., "Computational Aerodynamics of Baseball, Soccer Ball and Volleyball", American Journal of Sports Science, vol. 2, No. 5, pp. 115-121, doi: 10.11648/j.ajss.20140205.12, Sep. 20, 2014.

Kensrud et al., "Relating Baseball Seam Height to Carry Distance", Washington State University, Department of Mechanical and Materials Engineering, Procedia Engineering 112 (2015) pp. 406-411.

Robinson et al., "The Motion of an Arbitrarily Rotating Spherical Projectile and its Application to Ball Games", The Royal Swedish Academy of Sciences, vol. 88, No. 1, https://iopscience.iop.org/article/10.1088/0031-8949/88/01/018101;jsessionid=47C332E19E87E378510AA986E6E74A8D.c3.iopscience.cld.iop.org, Jul. 4, 2013, 18 pages.

De Mestre, "The Mathematics of Projectiles in Sport", School of Information and Computing Sciences, Bond University, Queensland, Australia, 1990, 38 relevant pages in total.

* cited by examiner

FIG. 5

SYSTEM AND METHOD FOR USING WEATHER APPLIED METRICS FOR PREDICTING THE FLIGHT OF A BALL

RELATED APPLICATION

This application is a Continuation-in-Part of U.S. patent application Ser. No. 15/796,983, filed on Oct. 30, 2017, which claims the benefit of U.S. Provisional Patent Application No. 62/414,686, filed on Oct. 29, 2016 both of which are hereby incorporated by reference in their entirety for all purposes.

BACKGROUND

The present invention relates generally to weather factors in sports. More particularly, the present invention relates to a system and method for predicting the flight of a ball based on weather conditions at a particular location.

Weather has a significant impact on many sports, such as baseball, football, golf, etc. There is a significant amount of credible research that explains how weather impacts the balls used in all major sports. Given the knowledge that weather can impact the flight of a ball, it would be desirable to have a system for predicting the flight of a ball in sports at a given location based on the current weather conditions.

BRIEF DESCRIPTION OF THE DRAWINGS

The invention, together with further objects and advantages thereof, may best be understood by reference to the following description taken in conjunction with the accompanying drawings in which:

FIGS. 5-6 are exemplary screenshots of spreadsheet application for determining the impact of weather on a baseball, in accordance with an embodiment.

DETAILED DESCRIPTION OF EMBODIMENTS

The present invention relates generally to a system for predicting the flight of a ball at a given location based on weather conditions. The embodiments herein describe a system and method for collecting weather data at a location and using the data to predict the flight of a ball at the location based on weather conditions. The embodiments described herein can model the impact of weather parameters on the flight of a ball for any outdoor sport. It will be noted that the impact of weather on a sporting event can be predicted in advance. In some cases, the predictions can be made as much as four to five days in advance of the event.

Referring to FIGS. 1-4, embodiments of the system will be described. The system collects weather data and can use both historical and current weather data for a given location to determine the impact of the current weather on the flight of a ball in the location. The five most significant weather parameters on the flight of a ball, such as a baseball, are wind (both horizontal and vertical), humidity, temperature, barometric pressure, and rainfall. According to an embodiment, the model for predicting the impact of these weather parameters on the flight of a ball is based on the weighted contribution of each of the parameters is as follows: wind, humidity, temperature, barometric pressure, and rain. The relative contribution of these parameters varies based on the given conditions. For example, wind can have zero impact if it's not blowing or it can have nearly 100% of the impact if it is blowing at 50 mph. It will be understood that the five weather parameters do not all need to be factored into the calculations for determining the impact of weather conditions on the flight of a ball. For example, in some embodiments, it may be enough to factor in only wind and humidity. In other embodiments, wind and humidity as well as one or more of the other weather parameters may be considered.

Figure 1A:
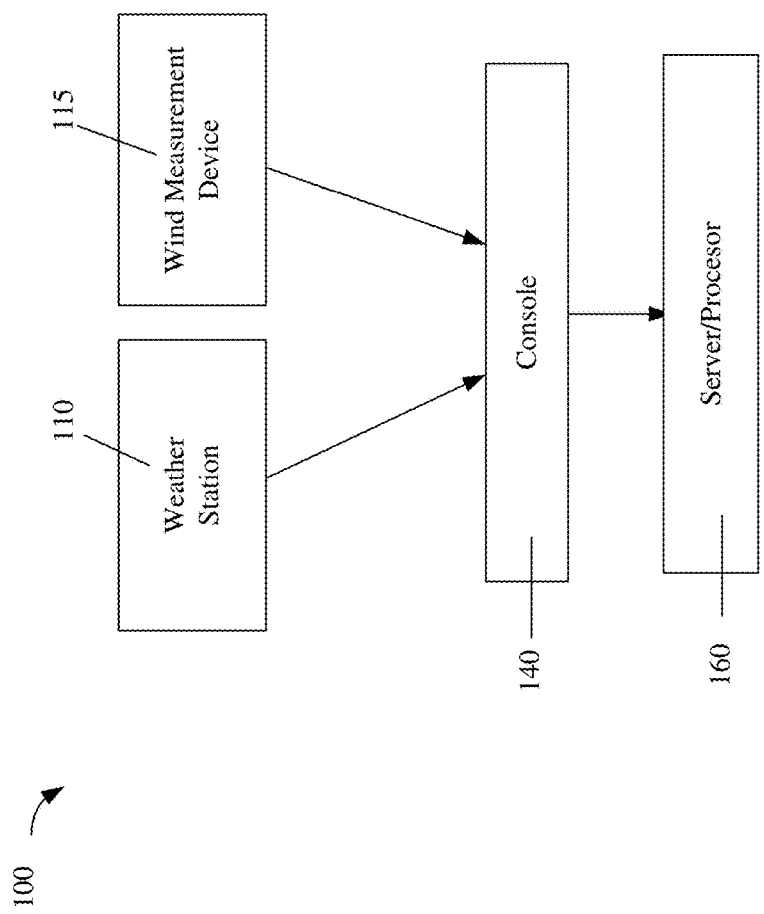
FIG. 1A is a conceptual schematic diagram of a system for predicting the flight of ball at a location in accordance with an embodiment.
Figure 1B:
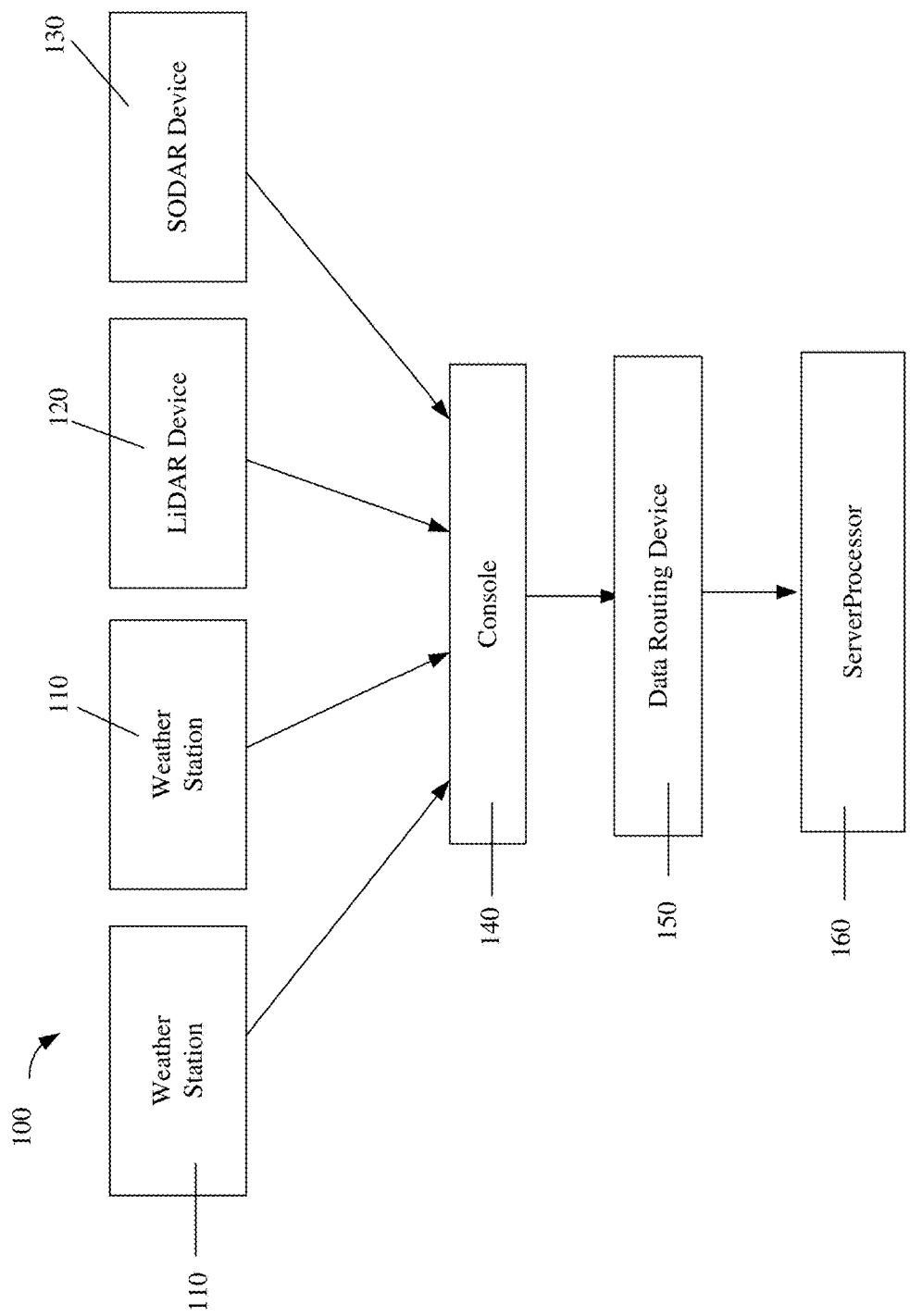
FIG. 1B is a conceptual schematic diagram of a system for predicting the flight of a ball as a location in accordance with another embodiment.

FIGS. 1A and 1B show conceptual schematic designs of embodiments of a system 100 described herein for predicting the flight of a ball based on wind, temperature, relative humidity, rainfall, and air pressure. In the embodiment shown in FIG. 1A, the system 100 includes a weather sensor 110, a wind measurement device 115, a weather console 140, and a server or processor 160. Wind measurement devices 115 include anemometers, LiDAR (Light Detection and Ranging) devices, SODAR (Sonic Detection and Ranging) devices, RADAR devices, and other instruments capable of measuring wind. Unlike anemometers, LiDAR, SODAR, and RADAR devices measure winds remotely. As will be explained in more detail below, the vertical component of wind can have a significant impact on the flight of a ball.

Another embodiment of the system 100 shown in FIG. 1B includes weather sensors 110, a LiDAR device 120, a SODAR device 130, a weather console 140, a data routing device 150, and a server or processor 160. The data routing device 150 transmits the collected data to the server or processor 160. It will be understood that, in some embodiments, wind measurement instruments, such as anemometers, may be used in place of LiDAR and SODAR devices. In still other embodiments, a LiDAR and/or a SODAR device is used to measure wind. Thus, a system 100 typically includes one or more wind measurement devices 115. In some embodiments, the weather sensor 110 may include a wind measurement device and there is no need for a separate wind measurement device 115.

Figure 2:
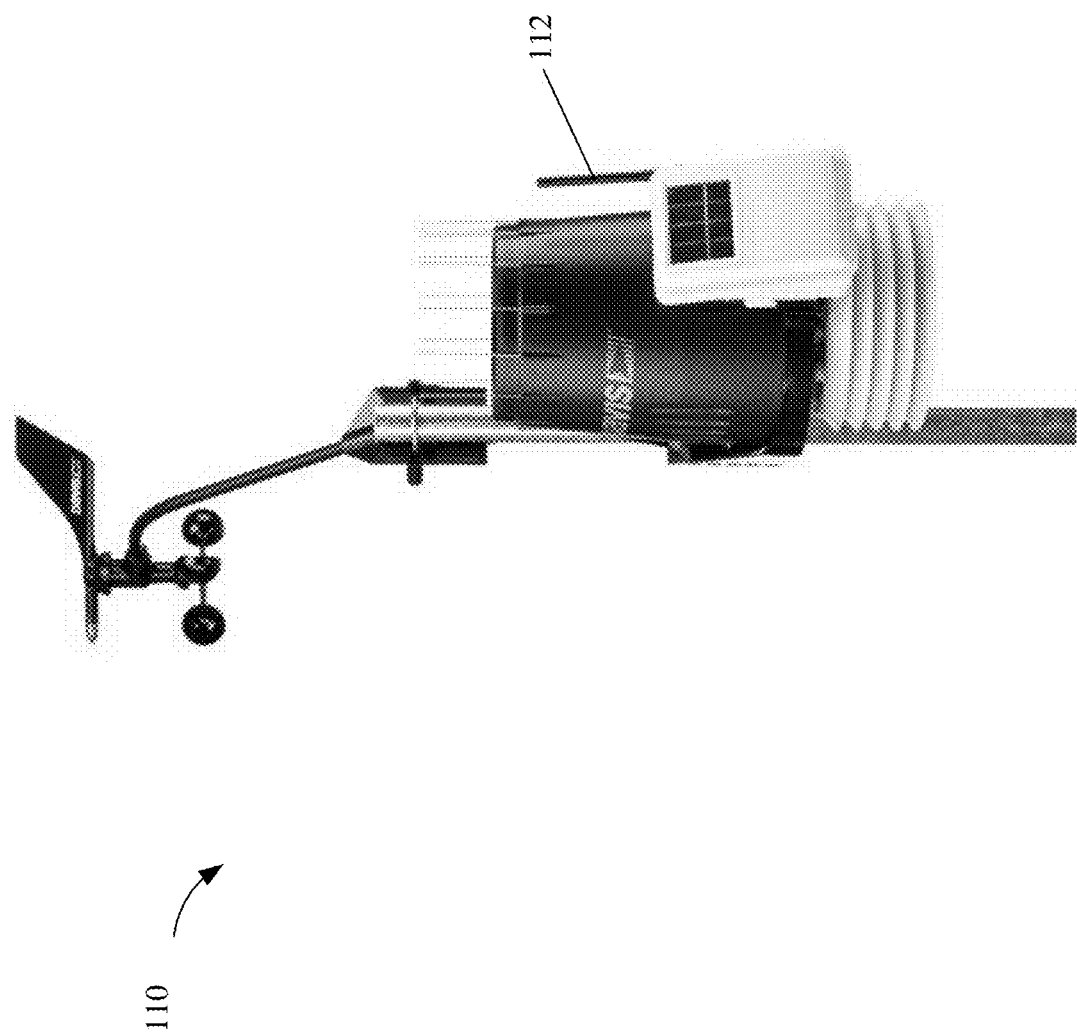
FIG. 2 shows an embodiment of a weather sensor that can be used in the systems shown in FIGS. 1A and 1B.

The weather sensors 110 in the embodiments described herein include sensors, including at least one of the following: thermometers for measuring temperature, humidity sensors for measuring humidity, anemometers for measuring wind speed, barometers for measuring air pressure, and rain gauges for measuring rainfall. A weather sensor 110 that can be used in the system 100 is shown in FIG. 2. Commercially available weather sensors that can be used in the system 100 include weather sensors from Campbell Scientific, Inc. of Logan, Utah and Davis Instruments Corporation of Hayward, Calif. It will be understood that other weather sensors that include thermometers and humidity sensors can also be used in the system. It will also be understood that, in other embodiments, the system 100 can be any number of thermometers, anemometers, and humidity sensors, barometers for measuring air pressure, and rain gauges for measuring rainfall as well as any number of LiDAR devices and SODAR devices and any number of data routing devices and weather consoles. It will be noted that a Meteobridge device, which is commercially available, is simply one approach to data transfer using a router connected to a network. Other data transfer systems include cell modems, or radio transfer.

A weather sensor 110 that can be used in the system 100 is shown in FIG. 2. The weather sensor 110 can include a thermometer, humidity sensor, and anemometer. According to another embodiment, a commercially available weather sensor from Campbell Scientific, Inc. includes two to ten pods positioned around the perimeter of a baseball stadium and each of the pods includes an anemometer and a rain gauge. In this embodiment, at least two of the pods also include a thermometer, barometer, and a humidity sensor.

Most of the time, wind has the most significant impact on the flight of a ball. Thus, it is critical to obtain accurate wind measurements. In smaller stadiums that have few obstructions (e.g., minor league baseball stadium or high school baseball field), wind measurements from standard anemometers (as describe above) positioned around the exterior of the field, can adequately represent the horizontal wind over the playing field. However, at larger sports stadiums with significant obstructions, wind flow over the field is much more complex. One example of this complexity is when wind flows over a large wall, the wall causes the flow downwind to become very turbulent. Such a flow is similar to that of a rushing stream as the water flows over a large rock. Thus, using anemometers to simply measure the wind around the exterior of the large stadium (having obstructions) does not provide enough useful information.

On larger sports fields, LiDAR and, to a lesser extent, SODAR devices can be employed to measure the wind over the field. What makes the LiDAR and SODAR devices most useful is that they measure wind remotely. That is, unlike the standard anemometer which measures wind only at its given location, the LiDAR AND SODAR devices measure wind at many distances (both horizontally and vertically) from where the device is located. LiDAR and SODAR devices make it possible to measure the wind over the sports field at several different heights and distances while the game is being played. Another benefit of using LiDAR and SODAR devices is that they can provide direct measurement of vertical wind. And in the cases where it is not possible to obtain this direct measurement of vertical wind, then the vertical wind can be calculated using the horizontal wind measurements that are measured using the LiDAR and SODAR devices. LiDAR devices 120 measure wind using light and SODAR devices measure wind conditions using sound. SODAR systems measure wind by emitting sound waves, primarily vertically. This limits the SODAR system's ability to measure wind over an entire sports field in real time. However, LiDAR systems emit light waves both vertically and horizontally, which allows for better coverage of wind measurements over an entire sports field. According to an embodiment, a LiDAR device 120 is installed in the stadium somewhere off the field where it continually scans the field to get the wind measurements. Instrumentation, including the commercially available Halo Doppler LiDAR, Zephir LiDAR, and/or other LiDAR instruments can be set up around the stadium to collect wind data. In a particular embodiment, the LiDAR device 120 in the system 100 is the commercially available Windcube® 100S, manufactured by Leosphere and distributed in North America by NRG Systems. The embodiment described above uses only LiDAR and SODAR devices because at present they are the most cost-effective means of obtaining useful wind measurements. But RADAR devices may also be applicable in the future.

The weather sensors 110, LiDAR devices 120, and SODAR devices 130 can be positioned anywhere in the stadium to collect weather data. According to an embodiment, the weather sensors 110, LiDAR devices 120, and SODAR devices 130 are positioned along roofs of buildings or along the perimeter of a stadium, as these locations are typically unobstructed. In a particular embodiment at a baseball stadium, the weather sensors 110, LiDAR devices 120, and SODAR devices 130 are positioned about 40 feet beyond the center field fence but they can also be positioned behind home plate, or in the stadium along the right or left field line. In some embodiments, the weather measurement devices 110, 120, 130 can be solar powered or battery powered.

Figure 3:
FIG. 3 shows an embodiment of a weather console that can be used in the systems shown in FIGS. 1A and 1B.
Figure 4:
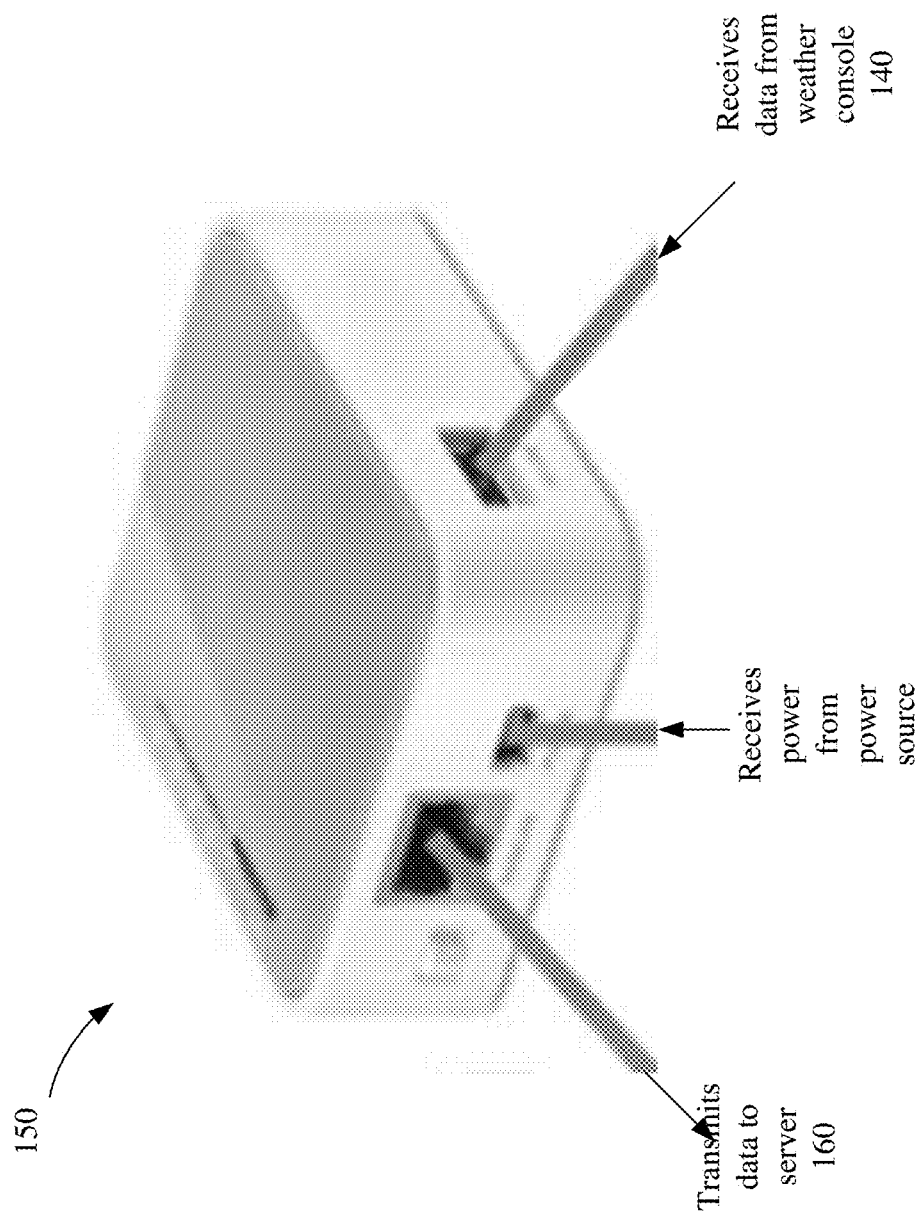
FIG. 4 shows an embodiment of a commercially available Meteobridge device that can be used in the system shown in FIG. 1B.

The weather data collected by the weather sensors 110, LiDAR devices 120, and SODAR devices 130 are transmitted, preferably wirelessly, to the weather console 140. According to an embodiment, the existing Wi-Fi at the stadium can be used for the wireless transmission. FIG. 3 shows an embodiment of a weather console 140 that can be used in the system 100. Davis Weather Instruments and Campbell Scientific have commercially available weather consoles. As shown in FIG. 2, a radio transmitter 112 is provided on each weather sensor 110 to transmit weather data collected by the sensors to the weather console 140. Radio transmitters can also be provided on the LiDAR devices 120 and SODAR device 130 to transmit data to the weather console 140.

The weather console 140 then transmits the collected weather data to the data routing device 150. This transmission from the weather console 140 to the data routing device 150 can be either wired or wireless. The data routing device 150 then transmits the collected weather data to a server or processor 160, which then makes calculations, based on a model, to predict the impact of weather conditions on the flight of a ball. Different embodiments of models for predicting the flight of a ball are described in more detail below. The data routing device 150 allows the collected micro climate weather data to be transmitted to the server or processor 160, which can use both historical and current weather data to calculate the impact of weather on the flight of a ball. In other embodiments, other devices, such as a computer, rather than a data routing device can be used to connect the weather console 140 to the server or processor 160. It will be understood that, in some embodiments, the weather sensors 110, LiDAR device 120 and SODAR device 130 transmit the weather data directly to a server or processor 160 without a data routing device.

In an embodiment, the system 100 uses wind, temperature, relative humidity, air pressure, and rain to calculate how many feet are being added to or subtracted from the flight of an average ball hit to the average distance to the outfield fence of a baseball stadium. These weather factors can also be used to calculate how many feet are being added to or subtracted from the flight of a ball thrown to home plate from an outfielder as well as balls thrown by a pitcher. These weather factors can also be used to calculate how much slower or faster a ball thrown in from the outfield to home plate will travel. It will be understood that, while a large portion of the description herein is applied to baseball, the models described herein can be applied to other sports, including football, golf, tennis, soccer, archery, rowing, bike racing, car racing, etc.

According to an embodiment, a model for predicting the flight of a ball at a given stadium is created by first analyzing long-term weather data sets, such as those collected by nearby weather sensors 110, LiDAR devices 120, and SODAR devices 130. From the historical weather data collected at the site, an "average day" is established. That is, when each weather parameter (excluding wind and rain) is at its long-term average for the start of the baseball game, then the sum of the parameters' influence on the ball must equal zero. The impact of wind on the ball can only be zero when there is no wind at all. Otherwise, the wind's influence on the ball is either positive or negative, left or right, and up or down. The influence of rain on the flight of the ball is only negative, as the heavier the rain, the more negative the impact on the flight of the ball. The model works by taking each parameter (except for wind and rain) and adding to (or subtracting from) the average day when the weather parameter enhances (or reduces) the flight of the ball. It will be understood that no two baseball stadiums (or any other type of stadiums) will have the exact same model, although they will generally be similar.

As noted above, there are five weather parameters that have an impact on the flight of a ball: temperature, relative humidity, barometric pressure, rain, and wind. The model used in a particular embodiment described herein is based the sport of baseball and on the flight of a baseball that travels a distance of 375 feet, which is the average distance of the outfield wall from home plate. It will be understood that since the average distance to the outfield wall is different for each stadium, this number will vary for each stadium. The influences of the different weather parameters are calculated to predict the flight of a ball, based on models that will be explained in greater detail below.

A brief summary of the weather influences on the flight of a baseball under most conditions is roughly as follows. Temperature increases the distance of the flight of a ball by approximately three feet for every 10 degree increase in temperature on the Fahrenheit scale. Humidity decreases this distance by approximately six feet for every 10% increase in humidity. Pressure increases this distance by approximately seven feet for every inch decrease in mercury. The wind influence on the distance of the flight of a ball is much more complex. Headwinds hamper the flight of a ball more than the addition to the flight of a ball from equal tailwinds. Downward wind has an adverse impact on the flight of a ball, while upward wind enhances the flight of a ball. The influence of the weather parameters on the flight of a ball are discussed in more detail below.

An example will be described below to illustrate the calculations performed by the system 100. Average values (except wind and rain) for each parameter are used as the basis for the calculations. It will be understood that these average values are exemplary and are based on a particular location. For illustration purposes, in a particular example, the following are assumed: the average temperature is 81° F., the average humidity is 59%, and the average pressure is 29.92 inches of mercury. The server or processor 160 calculates an index value of how many feet are being added to left field, center field, and right field. Data are collected at the field and transmitted to the server. The software screens the data for accuracy, and then the data is fed into the model, which calculates how many feet the weather is adding to or subtracting from the average fly ball hit 375 feet. In this particular embodiment, meteorological data for each ball are available, but flight (statcast) data on each ball are not available. Therefore, all of the calculations in this embodiment are based around the flight of an idealized or average ball hit to the warning track, which is assumed to be about 375 feet from home plate. In other embodiments, where actual flight data is available, specific impacts of weather on that given ball can be calculated. In accordance with an embodiment, the calculations are displayed on a screen. According to an embodiment, the calculations are uploaded to a website and can be updated (e.g., every 8 to 20 seconds)

It will be understood that, as the different weather parameters are measured in different units, each parameter must be multiplied by a particular predetermined coefficient in order to scale each parameter so that it has the appropriate contribution to the flight of the ball. What are illustrated here are averaged simplified estimates of the influences of each weather parameter. As will be explained in more detail below, there are 90 different configurations for coefficients in a particular embodiment. That is because there are a number of calculations published in the scientific literature for drag coefficient, lift coefficient, and spin rate decay. In the model used for calculations in this embodiment, the coefficient of each of the parameters is provided below:

Temperature Coefficient=−0.3
Humidity Coefficient=0.6
Pressure=7
Wind=Varies based on the speed and direction of the wind and the spin of the ball
Rain=Varies based on how hard the rain is falling Temperature is positively correlated with the flight of the ball. That is, the warmer the temperature, the farther the ball will fly. This correlation is represented mathematically by Equation (1) to determine the contribution of the temperature to the impact caused by weather on the flight of the ball:

$$\text{Temp.}=\text{Temp. Coefficient}*(\text{Average Temp.}-\text{Actual Temp}) \quad (1)$$

Relative humidity, on the other hand, is negatively correlated with the flight of the ball because a moist ball is less elastic than a dry ball and thus will leave the impact point more slowly than a dry ball will for a given impact speed. That is, the lower the relative humidity, the farther the ball will fly. This correlation is represented by the following equation to determine the contribution of the humidity to the impact caused by weather on the flight of the ball:

$$\text{Humidity}=\text{Humidity Coefficient of }0.6*(\text{Average Humidity}-\text{Actual Humidity}) \quad (2)$$

Pressure is also negatively correlated with the flight of the ball. That is, the lower the pressure, the farther the ball will fly. This correlation is represented by Equation (3) to determine the contribution of the air pressure to the impact caused by weather on the flight of the ball:

$$\text{Pressure}=\text{Pressure Coefficient}*(\text{Average Pressure}-\text{Actual Pressure}) \quad (3)$$

Horizontal wind is treated as forward and backward. Forward wind is a tailwind, which increases the flight of the ball. Backward wind is a headwind, which decreases the flight of the ball. Any wind that is not directly forward or backward is broken down into its component parts so that a forward or backward wind can be used. For vertical wind, up is positive and down is negative. In some embodiments, vertical wind is assumed to be zero. Typically, vertical wind will not be assumed to be zero for larger stadiums.

A home run takes an average of 4-4.5 seconds from the time the ball is hit until the time the ball lands. The average home run ball reaches a maximum height of 100 feet in elevation. The average home run ball spends about 3 seconds above 50 feet and below 100 feet in elevation. Thus, the wind that will have the biggest influence on the flight of the ball is between 50 and 100 feet in elevation.

It is clear that the wind's influence on the ball is not constant over its trajectory. In an embodiment, average wind speed from 50 to 100 feet in elevation is used in the model. In a larger stadium system, where LiDAR (or SODAR) is used, the actual measured wind speed (not an average wind speed) is used in the model. Wind is represented mathematically as set forth below.

Horizontal wind is measured and then broken down into its component parts on an X-Y axis, where the X-axis runs from home plate in the direction that the ball initially leaves the bat, and the Y-axis runs to the left of that direction. Thus a ball hit initially toward $2^{nd}$ base will have the X axis increasing toward centerfield and the Y axis increasing toward $3^{rd}$ base along a line running from $1^{st}$ base to $3^{rd}$ base.

The X-component of the wind is calculated using Equation (4):

$$X\text{-component of Wind} = \text{Speed of Wind} * \text{Cosine}(\text{Ball Park Orientation} + \text{Ball Angle} - \text{Wind Direction}) \quad (4)$$

where Ball Park Orientation is the direction in degrees (where 360 degrees is north and 180 degrees is south) of the line that runs from home plate to straight-away center field and Ball Angle is 0 degrees for a ball initially hit towards center field and +/−45 degrees for a ball initially hit toward right/left field. For a Ball Park Orientation of 360 degrees, home plate would be north of straight-away center field. The Y-component of the wind is calculated using Equation (5):

$$Y\text{-component of Wind} = \text{Speed of Wind} * \text{Cosine}(\text{Ball Park Orientation} + \text{Ball Angle} + 90 - \text{Wind Direction}) \quad (5)$$

A headwind shortens the flight of a ball more than a tailwind lengthens the flight of the ball. The influences of wind on the flight of a ball are non-linear and include drag, lift, and gravity forces.

Rain only detracts from the flight of a baseball. When the ball becomes wet, it becomes heavier, which causes the ball to travel a shorter distance than it would have if it were dry. Additionally, a wet ball is more "spongey," which causes the ball to leave the bat with a lower initial velocity than it would have if the ball were dry. The impact of rain is calculated using Table 1 below.

TABLE 1

| Rain Amount | 0.151 | 0.091 | 0.041 | 0.021 | 0.11 | 0.001 | 0.000 |
|---|---|---|---|---|---|---|---|
| 5 Mins Ago | −100 | −100 | −90 | −60 | −45 | −35 | 0 |
| 10 Mins Ago | −70 | −40 | −25 | −15 | −10 | −6 | 0 |
| 15 Mins Ago | −36 | −17 | −10 | −7 | −5 | 0 | 0 |
| 20 Mins Ago | −32 | −14 | −7 | 0 | 0 | 0 | 0 |
| 25 Mins Ago | −28 | −11 | 0 | 0 | 0 | 0 | 0 |
| 30 Mins Ago | −24 | −8 | 0 | 0 | 0 | 0 | 0 |
| 35 Mins Ago | −20 | −5 | 0 | 0 | 0 | 0 | 0 |
| 40 Mins Ago | −16 | −2 | 0 | 0 | 0 | 0 | 0 |
| 45 Mins Ago | −12 | 0 | 0 | 0 | 0 | 0 | 0 |
| 50 Mins Ago | −8 | 0 | 0 | 0 | 0 | 0 | 0 |
| 55 Mins Ago | −4 | 0 | 0 | 0 | 0 | 0 | 0 |
| 60 Mins Ago | 0 | 0 | 0 | 0 | 0 | 0 | 0 |

The contribution of each parameter (e.g., temperature, humidity, pressure, wind, and rain) is calculated and then summed together to obtain the net impact on the flight of the ball.

Figure 5:
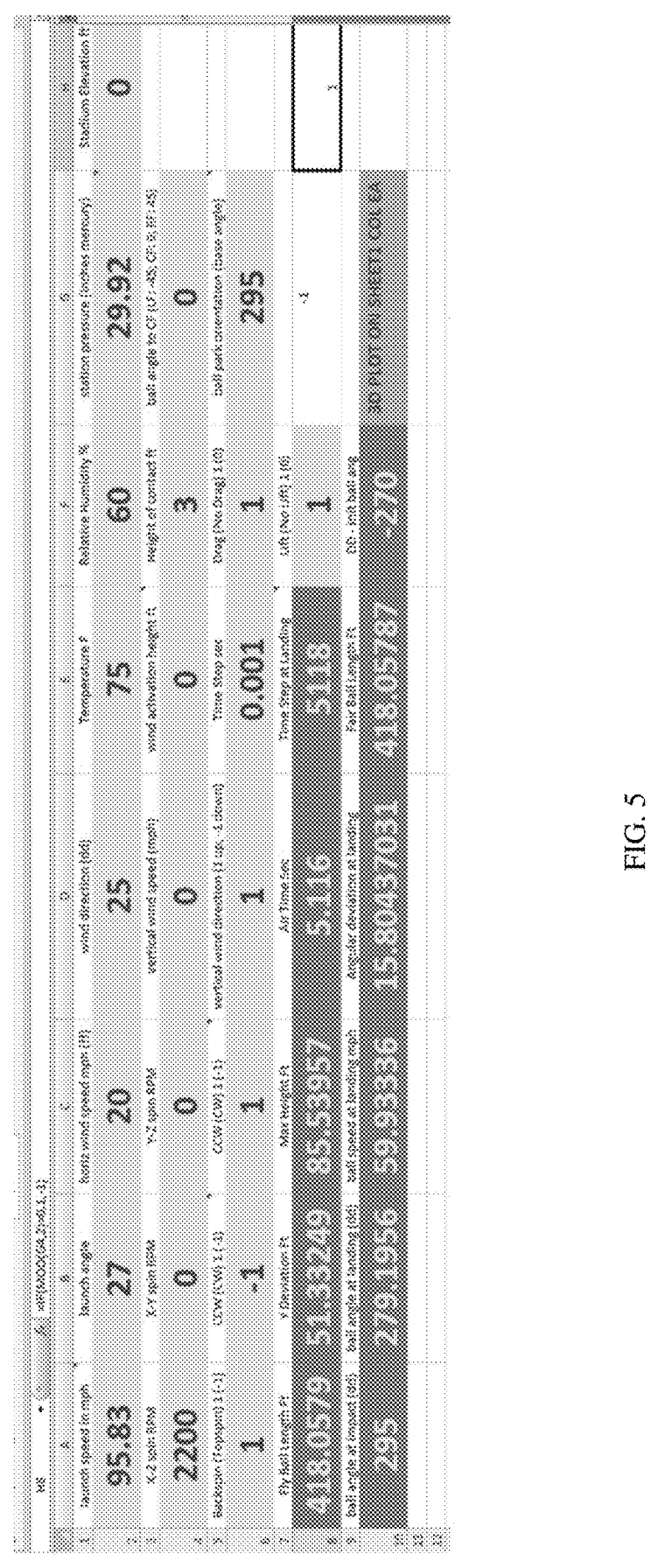
Figure 6:
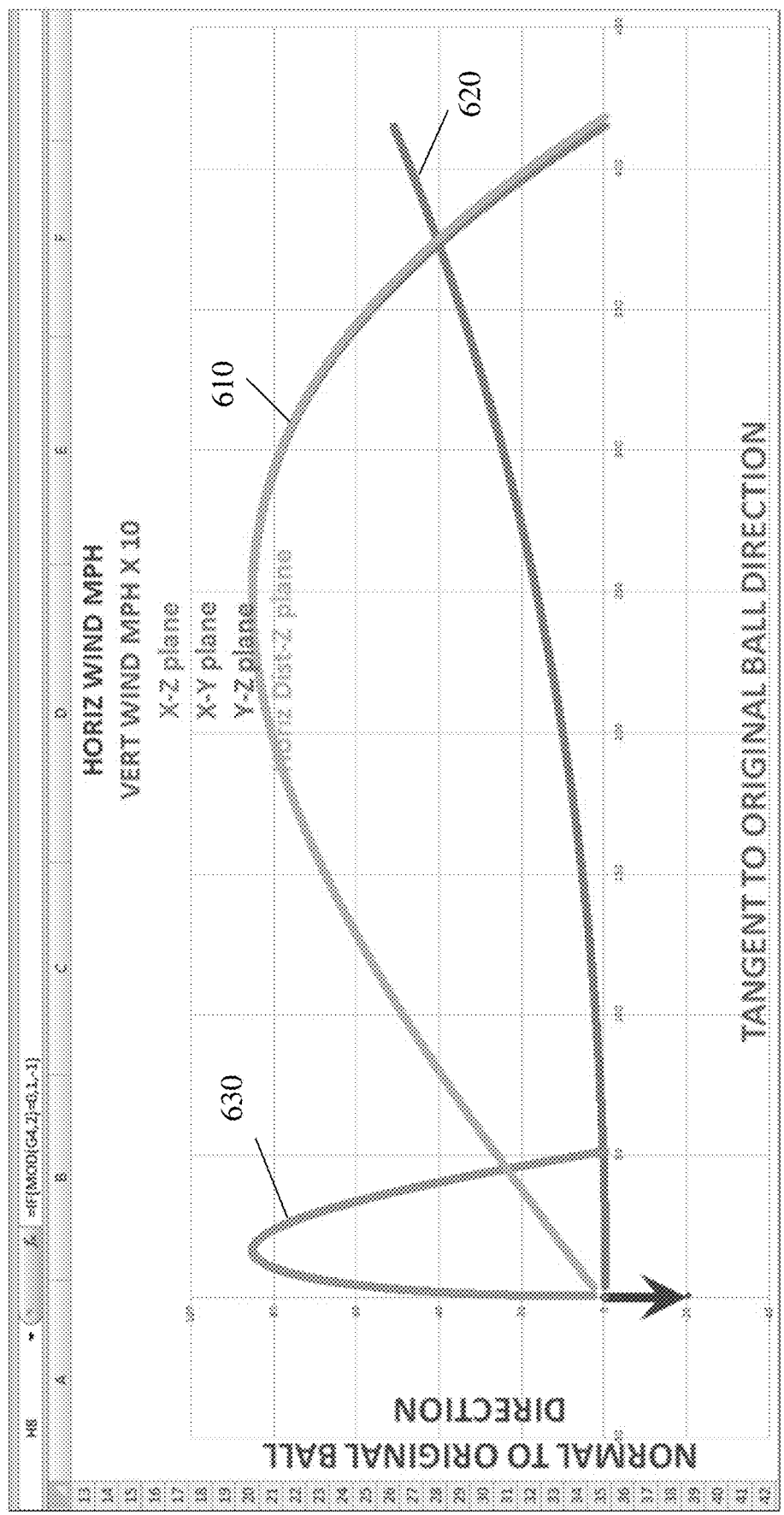

In a particular embodiment, the model that is used to predict the impact of weather parameters on the flight of a ball resides on an application, such as, for example, a spreadsheet that can receive various inputs and calculate the flight of the ball based on the weather conditions. Various pages of the spreadsheet of this embodiment are shown in FIGS. 5-6. The model illustrated in FIGS. 5-6 is used for baseball. However, it will be understood that the model can be modified to determine the influence of weather on the flight of a ball in other sports, including football, golf, soccer, and tennis.

As the specific model illustrated in FIGS. 5 and 6 is based on baseball, the forces that affect the flight of a baseball will be discussed below. There are three vectors (forces) that act on a baseball while it is in flight. These vectors are gravity, drag, and the lift or magnus force. At each instantaneous moment the ball's velocity is traveling in a specific direction, and the angle between this direction and the ground is the ball's current angle of orientation. The drag force always acts in the opposite direction of the velocity vector. The lift or magnus force acts perpendicularly to the spin axis of the ball, and generally points away from the ground (assuming the ball is hit with backspin). Gravity always pulls the ball directly from its center of mass straight to the ground, so the direction of the force of gravity is independent of the ball's orientation.

Gravity is the natural force that pulls all objects (including the ball) towards the earth. The force of gravity is fairly simple, and is easily determined by multiplying the constant acceleration of gravity g by the mass of the ball M. Thus, the force of gravity on the baseball is M*g.

Calculating the drag force is much more complex. Drag force is the force of air resistance that slows the ball down. Physically put, the drag force is equal to 0.5 multiplied by the air density (rho), multiplied by the cross-sectional area of the ball and the drag coefficient, and then finally multiplied by the ball's air speed squared. Thus, the drag force=$0.5*\text{rho}*A*Cd*V_a^2$. Rho or air density is a measure of how tightly air is packed. A rise in temperature, or a lowering of pressure, results in a lower air density. There are three different options for calculating air density and the most common is the following equation: rho=P/(RdT)

According to this embodiment, initial parameters for the flight of the ball, such as the ball's launch speed, launch angle, spin rate (in all directions), and spin rate decay, are input using a spreadsheet, such as the one shown in FIG. 5. As shown in FIG. 5, these initial parameters are entered into the spreadsheet in appropriate places, either manually by a user or received from a source. Each initial parameter will be discussed below.

Launch speed (mph), launch angle (degrees), and spin rate (rpm) are routinely measured by all major league baseball teams for all of their teams (both minor and major league). According to an embodiment being used in real time, an average of each of launch speed, launch angle and spin rate is received by the application (spreadsheet) as inputs. The weather parameters (horizontal wind speed, wind direction, temperature, relative humidity, station pressure, and rain are measured with weather instruments, such as those described above. The inputs of the weather parameters can be received by the server or other processor from the weather instruments via wireless transmission, as described above. In some embodiments, the stadium elevation is also entered, as it is sometimes important for including in the adjustment calculation of station pressure.

X-Z spin is the spin of the ball about the Y axis. This is spin that would rotate counterclockwise or clockwise from a right field view perspective of the ball flight, where the Z direction runs from the ground vertically straight up in the air, and the X direction runs from home plate in the initial horizontal direction that the ball leaves the bat. Thus, the Y-axis runs in the horizontal plane perpendicular and to the left of the X direction as viewed from home plate. This spin results in an up or down motion, which would cause a change in the lift coefficient, and therefore used in some of the embodiments of the model described herein. The X-Z spin is typically tracked by Doppler radar and these statistics are provided by major league baseball teams.

X-Y spin is the component of spin of the ball about the Z axis. This is spin that would rotate counterclockwise or clockwise from a bird's eye view perspective of the ball flight, where the X and Y directions are as defined above. Normally, a baseball hit to center field has very little spin along this axis, while a baseball hit to left field would have positive (counterclockwise) spin and a baseball hit to right field would have negative (clockwise) spin, but any spin would cause a change in the lift coefficient.

Y-Z spin is the spin of the ball about the X axis. This is spin that would rotate counterclockwise or clockwise from a center field view perspective of the ball flight, where the X, Y, and Z directions are as defined above. This spin results in side to side motion as well as up and down motion, and can be calculated given the angle spin which is readily available from the teams' databases. However, it will be noted that the Y-Z spin is normally negligible.

According to some embodiments, vertical wind speed is assumed to be zero, but actual vertical wind speed can be measured or calculated with LiDAR or SODAR measurements in larger stadiums. Wind Activation Height is the height at which the wind is assumed to start acting on the ball. That is, there is zero wind at the surface and it generally increases with increasing height. In order to calculate the impact of the wind on the ball, wind is assumed to be about one half the actual wind speed below the Wind Activation Height. In the illustrated embodiment, the wind Activation Height is assumed to be ground level, as shown in FIG. 5.

Height of Contact is the height above the ground that the ball is hit. For baseball, this is most often assumed to be an average of 3 feet above the ground. Ball Angle to CF is the angle of the ball hit in relationship to center field, and can also be tracked by Doppler RADAR. Thus, if a ball is hit directly to center field, this value will be zero. If a ball is hit to left of direct center, this value will be between −45 and zero. If a ball is hit to right of direct center, this value will be between zero and +45.

Backspin (Topspin) is simply counter-clockwise X-Z spin (see above), where 1 is backspin and −1 is topspin. This is used in calculating the upward or downward movement of the ball, as a ball with backspin is ascending and a ball with topspin is descending. This is used to calculate the direction and magnitude of spin in each direction, which impacts the lift coefficient (to be explained later).

In this embodiment, CCW (CW) is simply counter-clockwise X-Y spin (see above), where 1 is a ball spinning counter-clockwise (clockwise) as viewed from above. This would cause the ball to track to the left (right). This is used to calculate the direction and magnitude of spin in each direction, which impacts the lift coefficient (explained in further detail below).

According to this embodiment, CCW (CW) is simply counter-clockwise Y-Z spin (see above), where 1 is a ball spinning counter-clockwise (clockwise) as viewed from home plate. This would cause the ball to track to the left (right). This is used to calculate the direction and magnitude of spin in each direction, which impacts the lift coefficient (explained in further detail below). In this embodiment, for Vertical Wind Direction, 1 means upward wind and −1 means downward wind.

Time step is the time interval in seconds that the ball is tracked through its flight. So a value of 0.001 has the ball being tracked every one thousandth of a second. This can be changed to accommodate any desired interval. It will be noted that the direction in which the ball is hit and the spin characteristics of the ball are tracked, using a device, such as Doppler RADAR.

In this embodiment, Drag (No Drag) is simply a switch to turn on or off the Drag coefficient. This is useful for doing theoretical calculations in a vacuum, when the Drag is set to zero. Drag coefficient will be discussed in more detail below, but a quick summary is that it is the friction applied by the air against the ball as it travels. There are eight different values referenced in the scientific literature for drag coefficient. Each of these has mathematical justification. As it is not clear which of these is the most accurate, the user is allowed to either select from one of the eight possibilities or take an average of the eight.

Ball park orientation is the angle (stated in 1 to 360 degrees) where straight-away center is pointing based on a line that extends from home plate, over second base, to straight-away center field.

Lift (no Lift) is a switch to turn on lift coefficient, where 1 is on and 0 if off. This is useful for theoretical calculations where the ball has no lift. Lift coefficient is related to the Bernoulli equation and it essentially is how the backspin of the ball helps it rise as it travels. There are five different values referenced in the scientific literature for lift coefficient. Each of these has mathematical justification. As it is not clear which of these is the most accurate, the user can either select from one of the five possibilities or take an average of the five.

After all of the above inputs are entered, then the flight of the ball is calculated and important variables are output and displayed on a screen, as shown in FIG. 5. The displayed variables can include the calculated fly ball length, maximum height of the ball, ball angle at landing, ball speed at landing, etc.

After the calculations are performed, a visual graph of the ball flight can be displayed on a screen, as shown in FIG. 6. In FIG. 6, Line 610 shows the view looking in from right field. Line 620 shows the view from above where the ball originates at home plate (left) and ends in the outfield (right). Line 630 represents the view of the ball from straight-away center field, based on the inputs received, as shown in FIG. 5.

It will be understood that the embodiment described above with reference to FIGS. 5-6 applies to baseball. Thus, the following constants are used in the calculations set forth below in order to provide the calculations and visual graph displayed, as shown in FIG. 6:

Mass of baseball (m)=0.145 kilograms
Radius of baseball (r)=36.4 mm
Cross sectional area of baseball (A)=$\pi*(r^2)m^2$
Air Constant (Rd)=287 J/kg/K
Gravity (G)=9.8 m/s$^2$ To determine the distance X that the ball travels in the x-direction (horizontal distance in the direction of the ball coming off the bat based on the given weather parameters, Equation (6) is used:

$$X = x_o + \sum_{i=0}^{i=n} \Delta x_i \qquad (6)$$

where $\Delta x = u_i * \Delta t$ and u=x velocity, i=time step, and $\Delta t$=change in time. Likewise, v=y velocity and w=z velocity of the ball.

It will be understood that the subscript "i" refers to the ith timestep, where i starts at zero when the ball is hit and continues for as many timesteps until i=n when z=0, i.e., the ball is either on the ground or would have reached the ground at the same level as home plate.
where:

$u_i = u_{i-1} + \Delta u_i$ $\Delta u_i = ((x\text{drag}_i + x\text{lift}_i)/\text{mass of baseball}) * \Delta t$ $x\text{drag}_i = -\text{abs}(ua_i * FFFa_i) * \text{sign}(ua_i) * \text{rho} * A * Cd * 0.5$ $y\text{drag}_i = -\text{abs}(va_i * FFFa_i) * \text{sign}(va_i) * \text{rho} * A * Cd * 0.5$ $z\text{drag}_i = -\text{abs}(wa_i * FFFa_i) * \text{sign}(wa_i) * \text{rho} * A * Cd * 0.5$ where $FFFa_i$ is the total 3 dimensional airspeed and sign (variable)=1 for variable >0; −1 for variable <0; and 0 for variable=0.
rho=air density=$1.2929*(273/(T+273))*(P*e^{\wedge}(-0.0001217*El)-0.3738*Rh*SVP/100)/760)$
$ua_i$=air speed velocity in x ($u_i$−$uair_i$)
$va_i$=air speed velocity in y ($v_i$−$vair_i$)
$wa_i$=air speed velocity in z ($w_i$−$wair_i$)
$uair_i$=x component of the wind velocity
$vair_i$=y component of the wind velocity
$wair_i$=z component of the wind velocity
T=temperature in Celsius
P=air pressure in mm of Hg
El=elevation in meters
Rh=relative humidity
SVP=Saturation Vapor Pressure
=$(0.61121*^{\wedge}((18.678(T/234.5))*(T/(257.17+T))))*760/101.325$
A=Cross Sectional Area of a baseball
Cd=Drag Coefficient=0.38

In this embodiment, the drag coefficient Cd is assumed to be constant. In other embodiments, the Cd may vary. The following Equations (7) and (8) are also used in the calculation:

$x\text{lift}_i = -(\text{abs}(va_i * FFFa_i) * \text{sign}(vai) + \text{abs}(wa_i * FFFa_i) * \text{sign}(wai)) * \text{rho} * A * Cl * 0.5$ \qquad (7)

$y\text{lift}_i = (\text{abs}(ua_i * FFFa_i) * \text{sign}(uai) + \text{abs}(wa_i * FFFai) * \text{sign}(wai)) * \text{rho} * A * Cl * 0.5$ \qquad (8)

where sign(var)=1 for var>0, −1 for var<0, and 0 for var=0, and where Cl (lift coefficient)=0.225. In this embodiment, the lift coefficient Cl is assumed to be constant. In other embodiments, the Cl may vary.

In the other two dimensions, Y (being oriented at a 90 degree angle from the forward direction of ball contact), and Z (being the up direction perpendicular to the ground), the equations for motion are almost identical to the equations for x, when each corresponding item is changed to reference the dimension being determined (for example, when looking at the z direction, each $u_i$ is replaced with a $w_i$). Acceleration in the z direction must be treated differently because the force of gravity must be accounted for using Equation (9):

$\Delta w_i = (((w\text{drag}_i + w\text{lift}_i))/\text{mass of baseball}) - g) * \Delta t$ \qquad (9)

where g=9.81 mm/s². The lift equation in the z direction is as follows in Equation (10):

$z\text{lift}_i = (\text{abs}(uai * FFFai) * \text{sign}(uai) - \text{abs}(vai * FFFai) * \text{sign}(vai)) * \text{rho} * A * Cl * 0.5$ \qquad (10)

where sign(var)=1 for var>0, −1 for var<0, and 0 for var=0.

Figure 7:
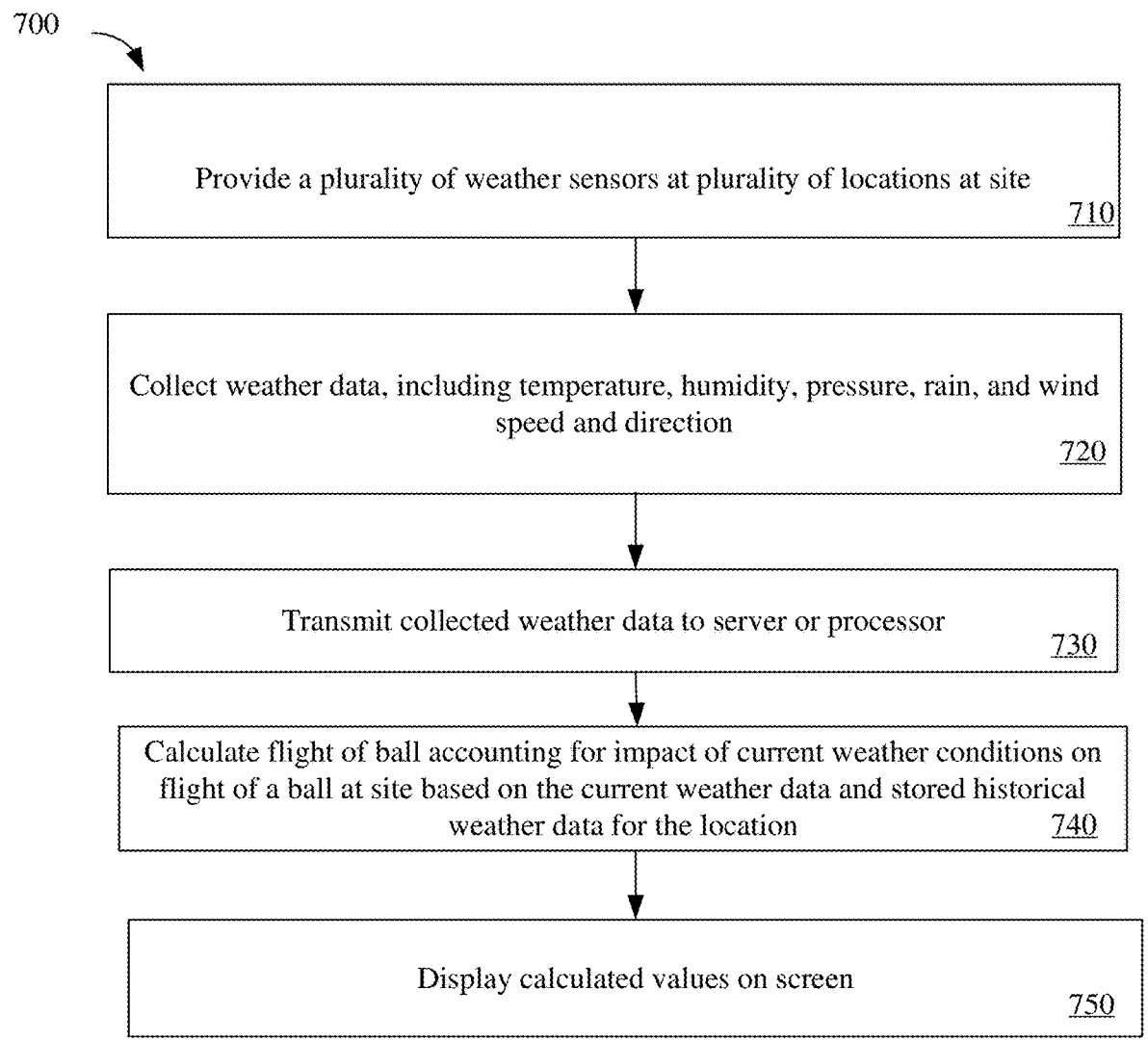
FIG. 7 is a flow chart of a method of predicting the impact of current weather conditions on the flight of a ball at a location in accordance with an embodiment.

FIG. 7 is a flow chart of a method 700 of predicting the impact of current weather conditions on the flight of a ball at a location. In Step 710, a plurality of weather sensors 110, are provided at different locations in the vicinity of a site, such as a sports field or stadium, to collect weather data. These locations are preferably unobstructed. In Step 720, the weather sensors 110 (and LiDAR devices 120 and SODAR devices 130, if present) collect weather data, which can include temperature, humidity, pressure, rain, and wind speed and direction. The weather sensors 110 (and LiDAR devices 120 and SODAR devices 130, if applicable) then transmit the data to a server or processor 160 in Step 730. In some embodiments, the transmission of data to the server or processor 160 can be performed wirelessly. In certain embodiments, the weather data is first transmitted to a weather console 140, which, in turn, transmits the data to a data routing device 150, which then transmits the data to the server or processor 160. The method 700 further includes Step 740 in which the server or processor calculates the flight of a ball, accounting for the impact of current weather conditions on the flight of the ball at the site, based on the current collected weather data as well as stored historical weather data for the location. In Step 750, the calculated values are displayed on a screen.

In accordance with an embodiment, the software on the server 160 performs several functions. The weather data are screened for accuracy by comparing the weather data collected from the weather stations 110 with each other. Any data that is determined to be out of bounds based on certain benchmarks is discarded. The data is then ingested into a model, which is based on the model described above, but is in a form that is conducive to quick calculations, where the model output is created in a fraction of a second using a combination of computer programming languages, including C, Python, and Perl. The model output gives the number of feet added to or taken away from the flight of the baseball by the current weather conditions in real-time. That information can be sent to and displayed on a website and can be updated frequently. According to an embodiment, the information is updated roughly every 15-20 seconds. The server or processor 160 can also archive the data and the calculations made.

In accordance with another embodiment, computational fluid dynamics (CFD) modeling is employed. According to this embodiment, wind is measured upstream of the stadium by wind sensors, such as anemometers, instead of positioning wind sensors in the stadium. Other suitable wind sensors include LiDAR and SODAR devices. In a particular embodiment, the wind sensors are positioned about ⅛-¼ mile upstream of the stadium. At some stadiums (e.g., stadiums that have a consistent sea breeze), the wind consistently blows in a certain direction, and the wind sensors can be positioned upstream of the stadium. However, at other stadiums, the wind direction may not be so consistent, and wind sensors will need to be positioned in different directions in the vicinity around the stadium in order to be able to measure the wind upstream of the stadium on any given day. In other embodiments, the wind sensors can be positioned downstream of the stadium or in another convenient location in the vicinity of the stadium.

It will be understood that, in this embodiment, the wind sensors should be positioned far enough away upstream from the stadium and other structures (e.g., billboards) such that an increase in wind speed due to compression does not occur where the wind sensors are positioned. Thus, it will be understood that the distance of the wind sensors from the stadium is site specific. In most embodiments, the distance of the wind sensors from the stadium is likely to be in the range of about ⅛-½ mile.

The wind measurements by the wind sensors are used as inputs into a CFD model that produces 3D wind vectors at grid-points above the field across the entire stadium. These 3D wind vectors are used as inputs into the trajectory model described above. As described above, the trajectory model calculates the distance and direction that a given ball will travel under current weather conditions. Linear interpolation can be used to determine the wind at the actual point of the ball.

As described below, according to an embodiment, a computational fluid dynamics (CFD) model can be used to provide the wind components in the stadium coordinate system even though the wind data are collected outside the stadium, where $x_s$ is zero at home plate and increases going toward the right field foul pole, $y_s$ is zero at home plate and increases going toward the left field foul pole and $z_s$ is just z, where z equals zero on the ground and increases vertically.

Using the data from the CFD model, the wind components are then linearly interpolated to each position of the ball at each time step on its trajectory. In order to calculate the trajectory of the ball, the wind components are resolved along (tangential) and perpendicular (normal) to the horizontal components of the original path of the ball. The vertical winds do not require any transformation. This is a two-step process.

First, the interpolated winds in the stadium coordinates are transformed into winds blowing from the standard west to east ($uair_g$) and south to north ($vair_g$) components. This could be referred to as compass or standard meteorological components. The equations for this transformation are as follows:

$$uair_g = uair_s * (\cosine(\dot{A})) + vair_s * (\sine(\dot{A})) \quad (11)$$

$$vair_g = vair_s * (\cosine(\dot{A})) - uair_s * (\sine(\dot{A})) \quad (12)$$

where $uair_s$ and $vair_s$ are the horizontal components of the wind in the $x_s$ and $y_s$ directions respectively, as defined above, and where $\dot{A}$=stadium orientation angle−225 degrees and where the stadium orientation angle=the compass heading from home plate to straight away center field+180 degrees.

Next, the compass or meteorological winds are converted into tangential and normal wind components to the horizontal components of the original path of the ball. This conversion is done using the following Equations (13) and (14):

$$dd = \arctan(-uair_g / -vair_g) \quad (13)$$

$$ff = ((uair_g)^2 + (vair_g)^2)^{0.5} \quad (14)$$

where dd=the compass heading from which the wind is blowing and
where ff=horizontal wind speed.

The tangential wind angle (tanwinang) and the normal wind angle (norwinang) are determined as follows, using Equations (15) and (16):

$$tanwinang = dd - ballangzero \quad (15)$$

$$norwinang = tanwinang + 90 \text{ degrees} \quad (16)$$

where ballangzero=stadium orientation angle+ball angle, and ball angle=−45 degree to the left field foul pole, zero degrees to straight away center field, and 45 degrees down the right field foul line, and $$uair_i = ff_i * (\cosine(tanwinang_i))$$

$$vair_i = ff_i * (\cosine(norwinang_i))$$

One CFD model that is suitable for use in this embodiment is ANSYS CFD software available from ANSYS of Canonsburg, Pa. The calculations in the CFD model can be made in real-time. Other CFD models, such as OpenFOAM, SolidWorks, Star-CCM, COMSOL's CFD Module, Altair's AcuSolve, can also be used to generate 3D wind vectors. In some embodiments, LiDAR can be used to measure the wind within the stadium in order to verify the 3D wind vectors generated by the CFD model. Other wind sensors, including drones, SODAR devices, and anemometers can also be used to verify the 3D wind vectors generated by the CFD model. Thus, LiDAR will not be used in real-time in this particular embodiment, but rather LiDAR, at different grid-points, can be used to measure the actual winds in the stadium, to verify the CFD generated 3D vectors.

In accordance with another embodiment, a number of preassigned CFD test cases are used to feed the trajectory model described above. In this embodiment, several wind inputs are thoroughly calculated ahead of time, and then live measurements are fitted to these calculations. In this setup, CFD modeling is not performed live. Instead, pre-calculated lookup tables are used for the 3D vector grid points.

According to another embodiment, a model for predicting the impact of these weather parameters on the flight of a ball is based on the weighted contribution of each of the parameters is as follows: wind 59%, humidity 30%, barometric pressure 8%, temperature 3%. According to the model in this embodiment, which can be applied to baseball as well as other sports (including football, golf, tennis, soccer), an "average day" is established and the "average day" is assigned a "50" on a scale from 1 to 100 based on the historical weather data collected at the site (e.g., stadium, sports field, golf course). That is, when each weather parameter is at its long-term average for the start of the game, then the sum of the parameters must equal 50. The next step is to establish the extremes of each of the weather parameters. From this, worst-case and best-case scenarios are established for each parameter. The worst-case scenario produces the largest possible reduction in the flight of the ball, with the combination of parameters yielding a "0" on the scale. The best-case scenario produces the largest possible increase in the flight of the ball, with the combination of parameters yielding a "100" on the scale. The restrictions on the model are that the sum of each of the parameter's influence on the flight of the ball can never fall below "0" or rise above "100." In this embodiment, the model works by taking each parameter and adding (or subtracting) to the average day when the weather parameter enhances (or reduces) the flight of the ball. It will be understood that no two stadiums (or sports fields or golf courses) will have the exact same model, although they will generally be similar.

The following description of this model is based on the flight of a baseball that travels a distance of 375 feet. However, it will be understood that the concepts can be applied to the flight of a ball in other sports, including, but not limited to, football and golf. For a baseball, as noted above, temperature influences this distance by approximately one foot for every 10 degree change in temperature on the Fahrenheit scale. Humidity influences this distance by approximately three to four feet for every 10% change in humidity. Pressure influences this distance by approximately seven feet for every inch change in mercury. Wind influences this distance by approximately 1.5 feet for every mile per hour of wind.

An example will be described below to illustrate the calculations performed by the system 100 in accordance with this embodiment of the model. Average values for each parameter are used as the basis for the calculations. It will be understood that the following average values are merely exemplary and are based on a particular location. The average temperature is 68° F. The average humidity is 60%. The average pressure is 29.92 inches of mercury. The average wind has forward speed of 10 mph. The server or processor 160 calculates an index value from 0 to 100, with 50 being average. That is, when all of the parameters are at their average values, then the index value is a 50. When the parameters combine to reduce or enhance the flight of the ball, then the index value is below or above 50, respectively.

It will be understood that, as the different weather parameters are measured in different units, each parameter must be multiplied by a particular coefficient in order to scale each parameter so that it has the appropriate contribution on a scale from 1 to 100. In the model used for calculations in this embodiment, the coefficient of each of the parameters is provided below:

Temperature Coefficient=−0.1
Humidity Coefficient=0.375 if Humidity is >59%
Humidity Coefficient=0.625 if Humidity is ≤59%
Pressure=7
Wind=2

Temperature is positively correlated with the flight of the ball. That is, the warmer the temperature, the farther the ball will fly. This correlation is represented mathematically by Equation (17) to determine the contribution of the temperature to the impact caused by weather on the flight of the ball:

$$\text{Temp.} = \text{Temp. Coefficient} * (\text{Average Temp.} - \text{Actual Temp}) \quad (17)$$

Relative humidity, on the other hand, is negatively correlated with the flight of the ball. That is, the lower the relative humidity, the farther the ball will fly. And as the relative humidity decreases, the impact on the flight of the ball increases exponentially. Thus, there is one coefficient used when the humidity is below the average humidity and there is another coefficient used when the humidity is above the average humidity. This correlation is represented by the following equations to determine the contribution of the humidity to the impact caused by weather on the flight of the ball:

If the Actual Humidity is >59%, then use Equation (18):

$$\text{Humidity} = \text{Humidity Coefficient of } 0.375 * (\text{Average Humidity} - \text{Actual Humidity}) \quad (18)$$

If the Actual Humidity is ≤59%, then use Equation (19):

$$\text{Humidity} = \text{Humidity Coefficient of } 0.675 * (\text{Average Humidity} - \text{Actual Humidity}) \quad (19)$$

As noted above, pressure is also negatively correlated with the flight of the ball. That is, the lower the pressure, the farther the ball will fly. This correlation is represented by Equation (20) to determine the contribution of the air pressure to the impact caused by weather on the flight of the ball:

$$\text{Pressure} = \text{Pressure Coefficient} * (\text{Average Pressure} - \text{Actual Pressure}) \quad (20)$$

As noted above, wind is treated as forward (tailwind) and backward (headwind), with a tailwind increasing the flight of the ball and a headwind decreasing the flight of the ball. Any wind that is not directly forward or backward is broken down into its component parts so that a forward or backward wind can be used.

For baseball, a home run takes an average of 4-4.5 seconds from the time the ball is hit until the time the ball lands. The average home run ball reaches a maximum height of 100 feet in elevation. The average home run ball spends about three seconds above 50 feet and below 100 feet in elevation. Thus, the wind that will have the biggest influence on the flight of the ball is between 50 and 100 feet in elevation.

It is clear that the wind's influence on the ball is not constant over its trajectory. Thus, average wind speed from 50 to 100 feet in elevation is used in the model in this embodiment. The maximum wind assumed is 30 mph. Wind is an insignificant factor when it is below 5 mph. It is assumed that there is never a backward wind of any consequence. Wind is represented mathematically as set forth below.

If the forward wind is greater than 10 mph and less than 30 mph, then Equation (21) applies:

$$\text{Wind} = \text{Wind Coefficient} * (\text{Average Wind} - \text{Actual Wind}) \quad (21)$$

If the forward wind is greater than 30 mph or less than 10 mph, the Wind value is as set forth in Table 2 below:

TABLE 2

| Actual Wind Speed | Wind Value |
|---|---|
| >30 mph | −40 |
| 9 mph | 3.3 |
| 8 mph | 6.7 |
| 7 mph | 10 |
| 6 mph | 13 |
| 5 mph | 16.7 |
| <5 mph | 20 |

Once each parameter's contribution is calculated, the contributions of the four parameters are summed together. If the four parameters add up to greater than or equal to zero, then Equation (22) applies:

$$\text{Weather Index} = \text{Sum of 4 Parameters} * 1.216 + 50 \quad (22)$$

If the four parameters add up to a negative number, then Equation (23) applies:

$$\text{Weather Index Value} = 50 + (\text{Sum of 4 Parameters} * 0.920) \quad (23)$$

Figure 8:
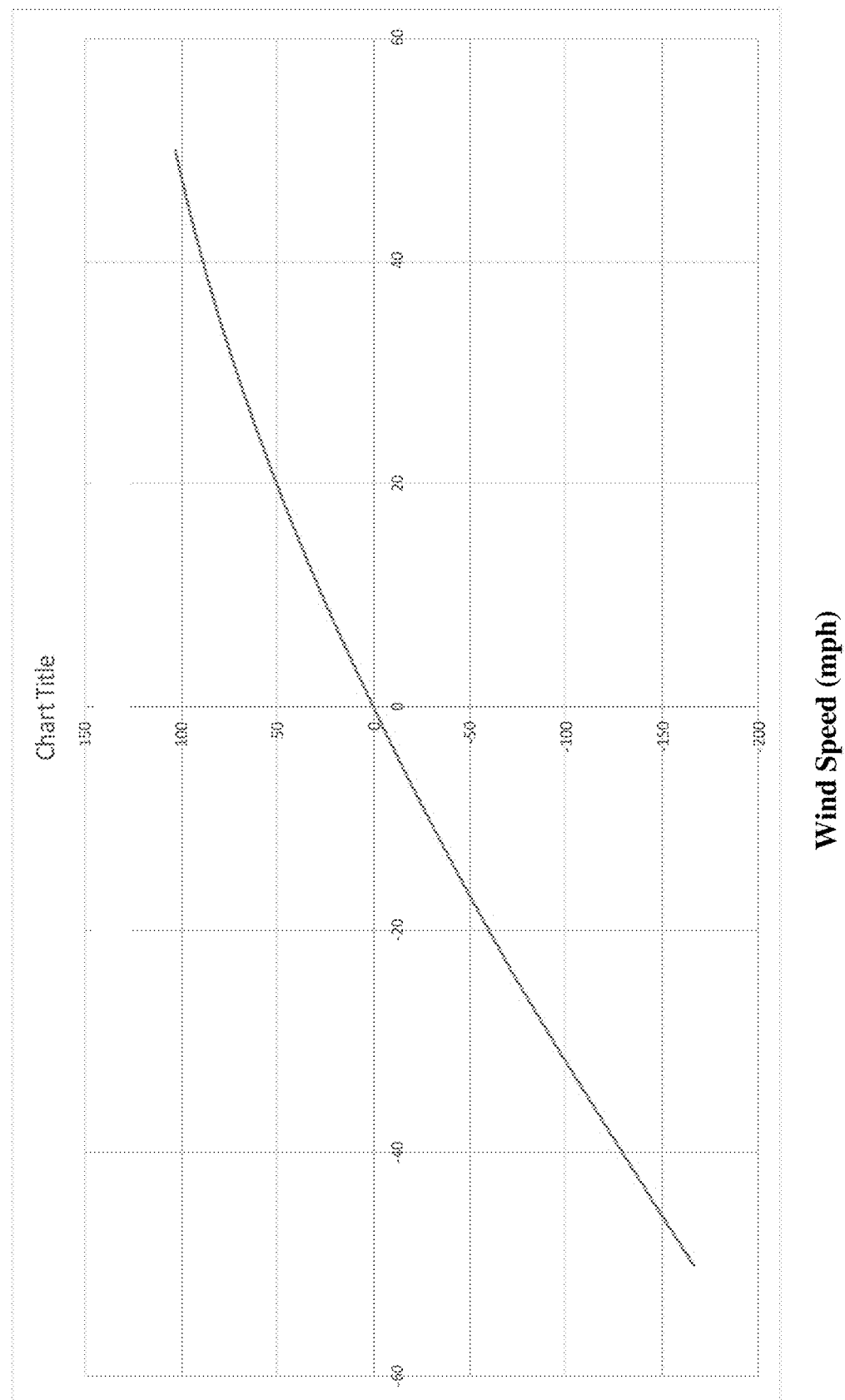
FIG. 8 shows a graph for determining how many feet are added to or subtracted from the flight of the ball given the horizontal wind value according to an embodiment.

According to an embodiment, the model tracks the flight of the ball in one thousandths of a second increments using the weather data's influence on lift force, drag force, and acceleration. Gravity, launch angle, and launch speed are also included in the calculations. FIG. 8 shows a graph for determining how many feet are added to or subtracted from the flight of the ball given the horizontal wind value (from −50 mph to +50 mph) according to this embodiment. It will be understood that the same can be done for vertical wind.

The relative humidity equation is as follows:

$$0.6 * (\text{Average Humidity} - \text{Measured Humidity}) \quad (24)$$

This equation is based on the assumption that a one percent change in relative humidity affects the distance of the flight of the ball by 0.6 feet.

The temperature equation is as follows:

$$0.375*(\text{Measured Temperature} - \text{Average Temperature}) \quad (25)$$

This equation is based on the assumption that a one degree change in temperature (on the Fahrenheit scale) affects the distance of the flight of the ball by 0.375 feet.

The barometric pressure equation is as follows:

$$7*(\text{Average Barometric Pressure} - \text{Measured Barometric Pressure}) \quad (26)$$

Barometric pressure is measured in inches of mercury. This equation is based on the assumption that a one inch change in barometric pressure affects the distance of the flight of the ball by seven feet.

As noted above, rain only detracts from the flight of a baseball, and the impact of rain is calculated using Table 1 above.

Figure 9:
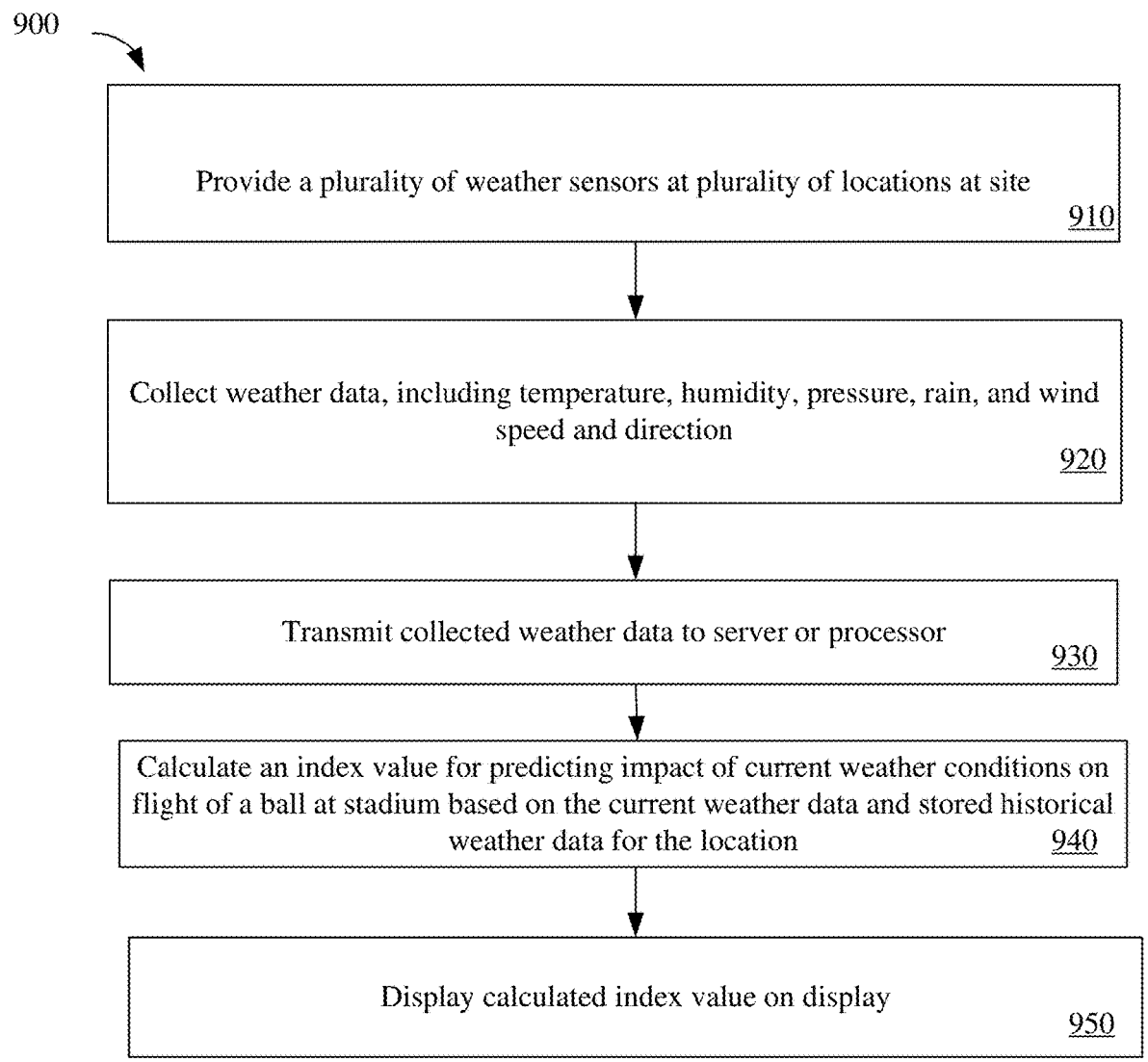
FIG. 9 is a flow chart of a method of predicting the impact of current weather conditions on the flight of a ball at a location in accordance with another embodiment.
Figure 10:
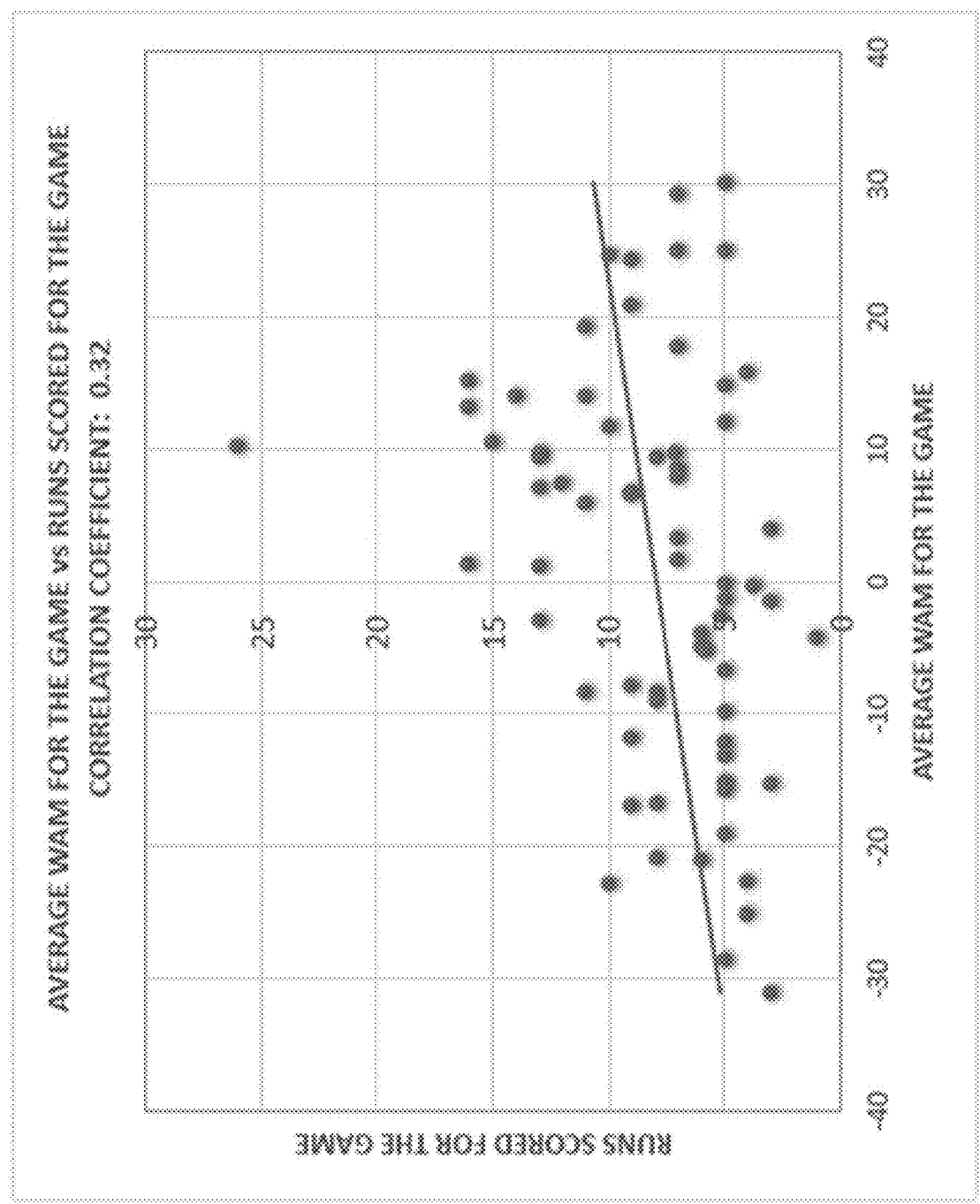
FIGS. 10-13 show exemplary scattergrams of calculated index values vs. metrics.
Figure 11:
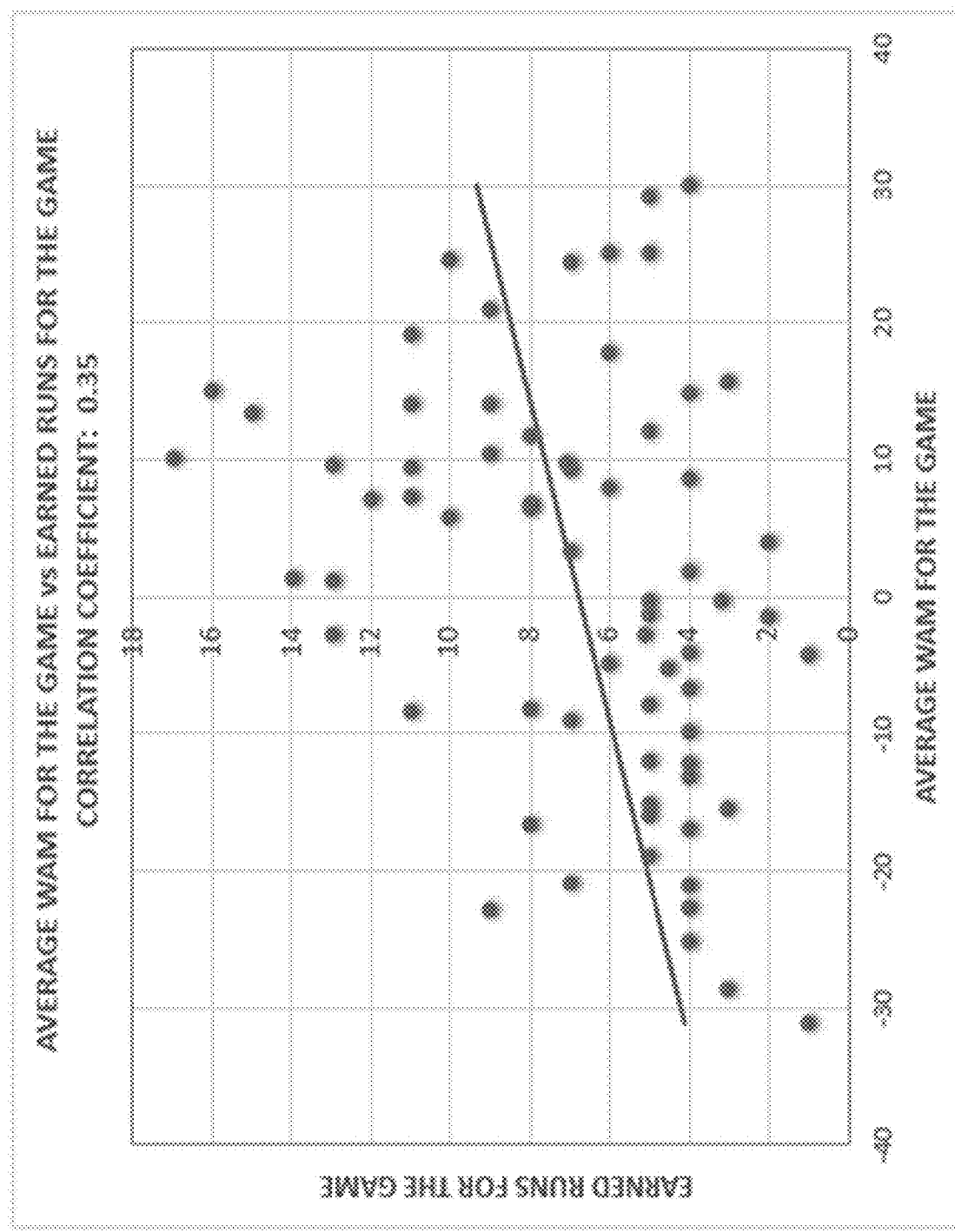
Figure 12:
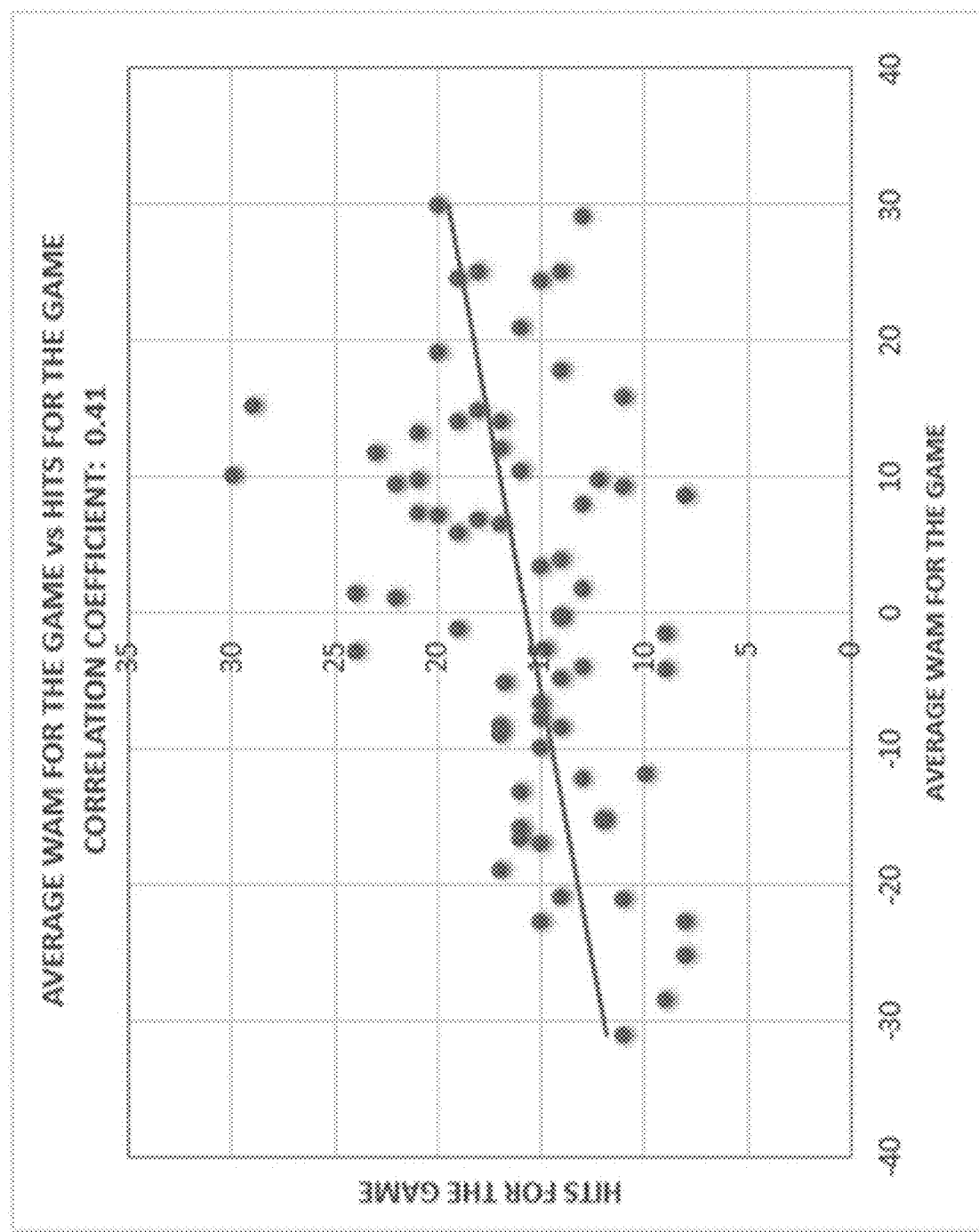
Figure 13:
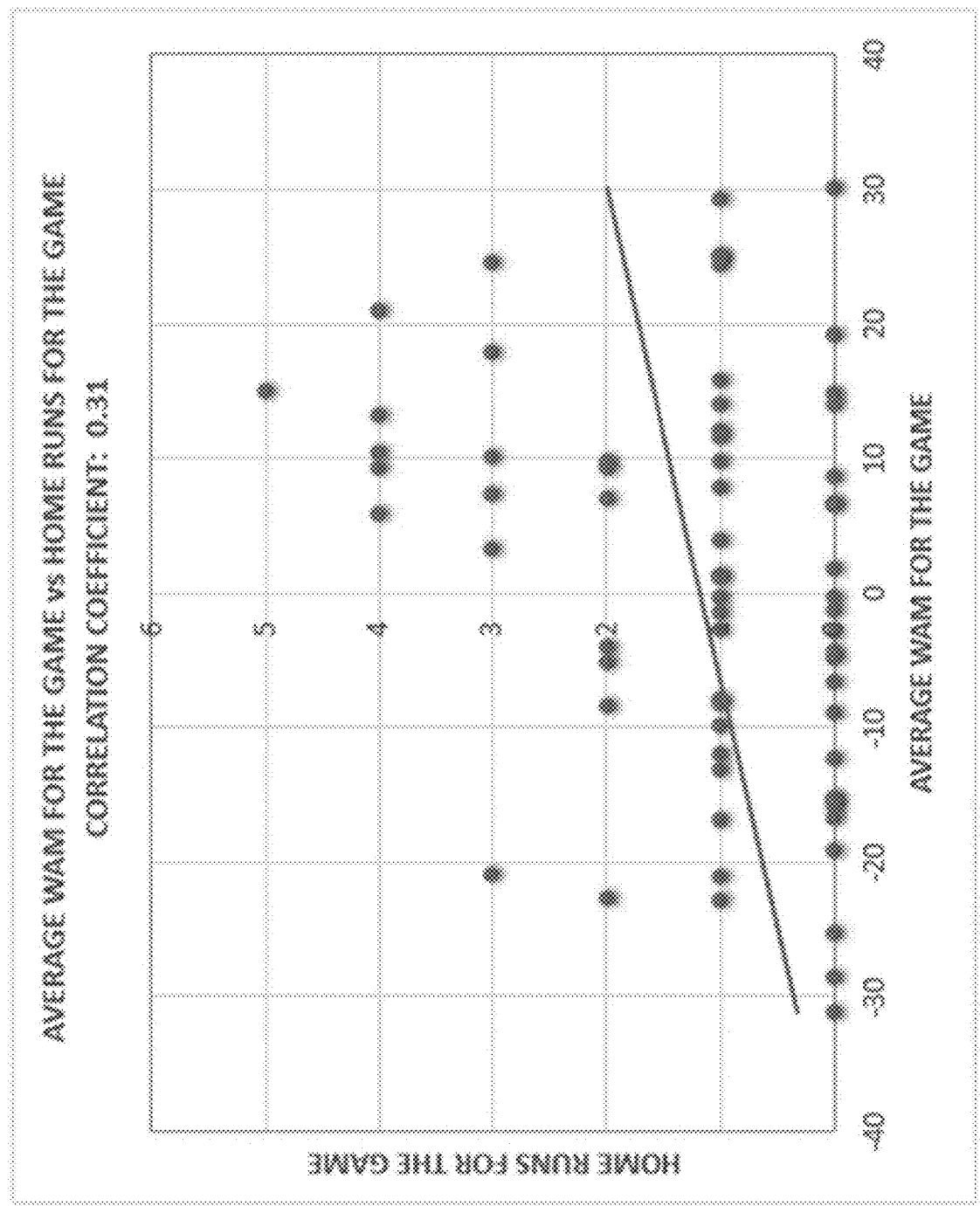

FIG. 9 is a flow chart of a method 900 of predicting the impact of current weather conditions on the flight of a ball at a location. In Step 910, a plurality of weather sensors 110, are provided at different locations in the vicinity of a site, such as a sports field or stadium, to collect weather data. These locations are preferably unobstructed. In Step 920, the weather sensors 110 (and LiDAR devices 120 and SODAR devices 130, if present) collect weather data, which can include temperature, humidity, pressure, rain, and wind speed and direction. The weather sensors 110 (and LiDAR devices 120 and SODAR devices 130, if applicable) then transmit the data to a server or processor 160 in Step 930. In some embodiments, the transmission of data to the server or processor 160 can be performed wirelessly. In certain embodiments, the weather data is first transmitted to a weather console 140, which, in turn, transmits the data to a data routing device 150, which then transmits the data to the server or processor 160. The method 900 further includes Step 940 in which the server calculates an index value for predicting the impact of current weather conditions on the flight of a ball at a location based on the current data and stored historical weather data for the location. The index value is correlated to a variance of weather conditions at the particular time relative to historical averages of each weather parameter based upon weighting each weather parameter's contribution at the particular time as follows: wind 59%, humidity 30%, temperature 3%, and barometric pressure 8%. In Step 950, the calculated index value is displayed on a screen.

The bulk game statistics below are given using the index value average for the entire game at a particular stadium.

Runs Per Game

When the index value average was positive for the game, the average number of runs scored was 9.92 runs per 9-inning game. When the index value average was negative for the game, the average number of runs scored per 9-inning game was 6.05 runs per game. Simply taking the difference, 3.86 more runs were scored (on average) when the index value was positive as opposed to when the index value was negative.

Earned Runs Per Game

When the index value average was positive for the game (right, center, and left), the average number of earned runs scored was 8.49 runs per 9-inning game. When the index value average was negative for the game, the average number of earned runs scored per 9-inning game was 5.09 runs per game. Simply taking the difference, 3.40 more earned runs were scored (on average) when the index value was positive as opposed to when the index value was negative.

Home Runs

There were 81 home runs hit during the season. 59 home runs were hit when the index value was positive. 22 home runs were hit when the index value was negative. So 73% of the home runs were hit when the index value was positive.

Home Runs Per Game—Positive vs. Negative Index Value

When the index value was positive, 1.69 home runs were hit per game. When the index value was negative 0.69 home runs were hit per game. So 1.0 more home run was hit per game when the index value was positive verses when the index value was negative.

Hits Per Game—Positive vs. Negative Index Value

When the index value was positive, there were 17.72 hits per game. When the index value was negative, there were 13.86 hits per game. So there were 3.86 more hits per game when the index value was positive verses when the index value was negative.

Correlation Coefficients

One important measure of the significance of the index value is how well it correlates with all of the above game statistics. This table shows the correlation coefficients between the index value average per game and runs per game, earned runs per game, hits per game, and home runs per game.

| Correlation Coefficient | Runs per Game | Earned Runs per Game | Hits per Game | Home Runs per Game |
| --- | --- | --- | --- | --- |
| Index Value Average per Game | 0.32 | 0.35 | 0.41 | 0.31 |

FIGS. 10-13 show scattergrams of the index values vs. the above metrics, where "Average WAM" is calculated average index value.

Although only a few embodiments have been described in detail, it should be appreciated that the invention may be implemented in many other forms without departing from the scope of the invention. In view of all of the foregoing, it should be apparent that the present embodiments are illustrative and not restrictive and the invention is not limited to the details given herein, but may be modified within the scope and equivalents of the appended claims.

What is claimed is:

1. A computer-implemented method of determining an impact of weather parameters on a flight of a ball at an outside sports venue in real time, the method comprising:
    at a processor, accessing a data storage that contains historical data for weather parameters, for at least one location at the outside sports venue, wherein the weather parameters include wind;
    at the processor, calculating a historical average for each of the weather parameters based on the historical data;
    at the processor, obtaining current data for current weather parameters via wireless transmission from at least one weather sensor positioned at or near the outside sports venue, wherein the current weather parameters include wind, wherein the current data for wind includes a horizontal component and a vertical component, wherein the at least one weather sensor comprises at least one weather sensor positioned upstream of the outside sports venue for obtaining wind data;
    at the processor, using a computational fluid dynamics model that generates 3D wind vectors within the outside sports venue based on the wind data obtained from the at least one weather sensor positioned upstream of the outside sports venue to calculate a flight of the ball based on the obtained current data for the current weather parameters and on the average for each of the weather parameters based on the historical data, wherein the current weather parameters include wind; and displaying on a screen the flight of the ball calculated by the processor.

2. The method of claim 1, wherein the weather parameters further include humidity, barometric pressure and temperature.

3. The method of claim 1, wherein the weather parameters further include rain.

4. The method of claim 1, wherein calculating the impact of the current weather parameters on the flight of the ball comprises determining a contribution of current wind based on one of actual measured wind speed and a historical average wind speed.

5. The method of claim 1, wherein the at least one weather sensor comprises at least one of a LiDAR device, a SODAR device, and an anemometer.

6. The method of claim 1, wherein the at least one weather sensor comprises at least one weather sensor positioned about ⅛-½ mile upstream of the outside sports venue for obtaining wind data.

7. The method of claim 1, wherein the method further comprises:
at the processor, calculating a trajectory of the flight of the ball based on the obtained current data for the current weather parameters and on the average for each of the weather parameters based on the historical data.

8. The method of claim 1, wherein the flight of the ball is the flight of a baseball hit by a bat at home plate of a baseball stadium.

9. A system comprising:
at least one weather sensor comprising at least one wind sensor;
a data storage containing historical wind data for a location at or near an outside sports venue, wherein the at least one wind sensor is positioned upstream of the outside sports venue;
a data storage that contains wind model data for the outside sports venue;
one or more processors that receive data wirelessly transmitted from the at least one weather sensor;
a machine-readable medium including instructions stored therein, which when executed by the one or more processors, causes the one or more processors to perform operations in real time comprising:
at a server, accessing a data storage that contains historical weather data, wherein the historical weather data comprises historical wind data for a location at or near the outside sports venue;
at the server, obtaining current weather data from the at least one wind sensor, wherein the current weather data comprises wind data; and
at the server, using a computational fluid dynamics model that generates 3D wind vectors within the outside sports venue based on the wind data obtained from the at least one wind sensor to calculate a flight of a ball at the outside sports venue taking into account impact of current weather conditions on the flight of the ball at the outside sports venue based on the obtained current weather data for current weather parameters and on an average for the historical weather data; and
a screen that displays in real time the flight of the ball calculated by the server.

10. The system of claim 9, further comprising at least one temperature sensor, at least one humidity sensor, and at least one barometric pressure sensor.

11. The system of claim 9, further comprising at least one of a weather console, a data routing device, a LiDAR device, a SODAR device, and an anemometer.

12. The system of claim 9, further comprising a wind sensor positioned at least ⅛ mile outside the sports venue.

13. The system of claim 9, wherein taking into account impact of current weather conditions on a flight of a ball at the outside sports venue comprises determining a contribution of current wind based on one of actual measured wind speed and a historical average wind speed.

14. The system of claim 9, wherein the current weather data comprising wind data comprises x, y, and z wind components and wherein using a computational fluid dynamics model comprises linearly interpolating the wind components to each position of the ball at each time step on a trajectory of the ball.

15. The system of claim 9, wherein the outside sports venue is a baseball stadium.

* * * * *